(12) United States Patent
Dally

(10) Patent No.: US 7,260,092 B2
(45) Date of Patent: Aug. 21, 2007

(54) TIME SLOT INTERCHANGER

(75) Inventor: William J. Dally, Stanford, CA (US)

(73) Assignee: LSI Corporation, Milpitas, CA (US)

( * ) Notice: Subject to any disclaimer, the term of this patent is extended or adjusted under 35 U.S.C. 154(b) by 1276 days.

(21) Appl. No.: 09/761,539

(22) Filed: Jan. 16, 2001

(65) Prior Publication Data

US 2001/0033584 A1   Oct. 25, 2001

Related U.S. Application Data

(60) Provisional application No. 60/237,086, filed on Sep. 28, 2000, provisional application No. 60/195,998, filed on Apr. 11, 2000.

(51) Int. Cl.
*H04L 12/50* (2006.01)
(52) U.S. Cl. .................... 370/369; 370/378; 370/503
(58) Field of Classification Search ................ 370/376, 370/375, 378, 379, 370, 380, 369, 503
See application file for complete search history.

(56) References Cited

U.S. PATENT DOCUMENTS

| | | | |
|---|---|---|---|
| 3,576,398 A | 4/1971 | Dejean et al. | 179/18 |
| 3,632,883 A | 1/1972 | Augaard | 179/15 |
| 3,735,049 A | 5/1973 | Buchner et al. | 179/15 AQ |
| 3,736,381 A | 5/1973 | Johnson et al. | 179/15 AQ |
| 3,832,492 A | 8/1974 | Charransol et al. | 179/15 |
| 3,927,267 A | 12/1975 | Voyer et al. | 170/15 AT |
| 4,004,103 A | 1/1977 | Liu et al. | 179/18 |
| 4,035,584 A | 7/1977 | Lurtz | 179/15 |
| 4,038,638 A | 7/1977 | Hwang | 340/166 |
| 4,123,624 A | 10/1978 | Gagnier et al. | 179/15 |
| 4,394,541 A | 7/1983 | Seiden | 179/18 |
| 4,470,139 A | 9/1984 | Munter | 370/66 |
| 4,566,007 A | 1/1986 | Richards | 340/825.8 |
| 4,764,918 A | 8/1988 | Waters | 370/14 |
| 4,771,420 A | 9/1988 | Deschaine et al. | 370/68 |
| 4,797,589 A | 1/1989 | Collins | 370/63 |
| 4,817,083 A | 3/1989 | Richards | 370/59 |

(Continued)

OTHER PUBLICATIONS

Benes, V. E., "On Rearrangeable Three-Stage Connecting Networks," The Bell System Technical Journal, vol. XLI, No. 5, Sep. 1962, pp. 1481-1492.

(Continued)

*Primary Examiner*—Wing Chan
*Assistant Examiner*—Richard Chang
(74) *Attorney, Agent, or Firm*—Christopher P. Maiorana

(57) ABSTRACT

A digital cross connect comprises plural switching stages. Each stage has plural switches which receive plural frames of time multiplexed input data and which switch the data in time and space. Configurations of the switches change in frame synchronization at the start of a synchronized data frame. Both the configuration data and a frame clock may be propagated through the plural stages from a master switch. First and last stages of the digital cross connect may be implemented on common chips having two framing time bases. Data may be aligned to a global frame clock and interchanged using a single random access memory in a time slot interchanger. The write address to the random access memory is generated from a local frame counter keyed to the input data frame while a read address is transformed from a global frame counter.

26 Claims, 16 Drawing Sheets

U.S. PATENT DOCUMENTS

| | | | |
|---|---|---|---|
| 4,849,964 A | 7/1989 | van Baardewijk | 370/63 |
| 4,885,738 A * | 12/1989 | Bowers et al. | 370/371 |
| 4,935,921 A | 6/1990 | Ishizaki et al. | 370/58.1 |
| 4,967,405 A | 10/1990 | Upp et al. | 370/1 |
| 5,040,170 A | 8/1991 | Upp et al. | 359/135 |
| 5,111,414 A | 5/1992 | Arrathoon | 364/713 |
| 5,144,297 A | 9/1992 | Ohara | 340/825.79 |
| 5,189,410 A | 2/1993 | Kosugi et al. | 340/825.14 |
| 5,303,077 A * | 4/1994 | Bottle et al. | 370/372 |
| 5,311,506 A | 5/1994 | Beisel | 370/58.1 |
| 5,323,390 A | 6/1994 | Pawelski | 370/63 |
| 5,345,441 A | 9/1994 | Paker et al. | 370/54 |
| 5,408,231 A | 4/1995 | Bowdon | 340/826 |
| 5,430,716 A | 7/1995 | Pawelski | 370/58.1 |
| 5,436,890 A | 7/1995 | Read et al. | 370/58.2 |
| 5,469,154 A | 11/1995 | Karp | 340/825.8 |
| 5,526,359 A | 6/1996 | Read et al. | 370/100.1 |
| 5,627,826 A * | 5/1997 | Kameda et al. | 370/371 |
| 5,629,932 A | 5/1997 | Kim | 370/382 |
| 5,987,027 A | 11/1999 | Park et al. | 370/360 |
| 6,034,947 A | 3/2000 | Yoshida et al. | 370/244 |
| 6,041,055 A | 3/2000 | Chopping | 370/391 |
| 6,243,400 B1 * | 6/2001 | Deutsch et al. | 370/540 |
| 6,674,752 B1 * | 1/2004 | Colizzi et al. | 370/372 |
| 6,778,529 B1 * | 8/2004 | Field et al. | 370/353 |

OTHER PUBLICATIONS

Clos, Charles, "A Study of Non-Blocking Switching Networks," Bell System Technical Journal, Mar. 1953, pp. 406-424.

"Lucent Technologies introduces cross-connect ship for high-speed optical networking systems," 1999, http://www.chipcenter.com/telecommunications/mdp/webscan/mn00e/mn00e16.htm; 2 pages.

"900-Series DSX (Digital Signal Cross-Connect) System," 1996, http/connectivity1.avaya.com/exchangemax/fact_sheets/pdf/2883fs-3.pdf, 6 pages.

* cited by examiner

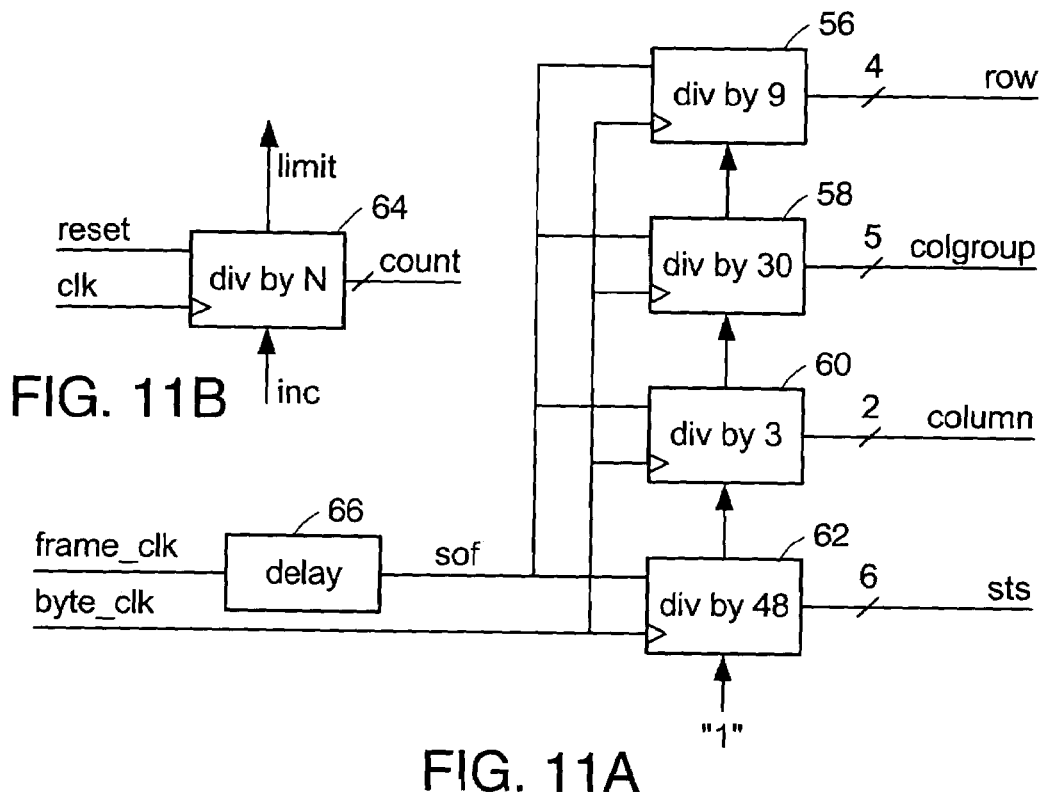
FIG. 11B
FIG. 11A
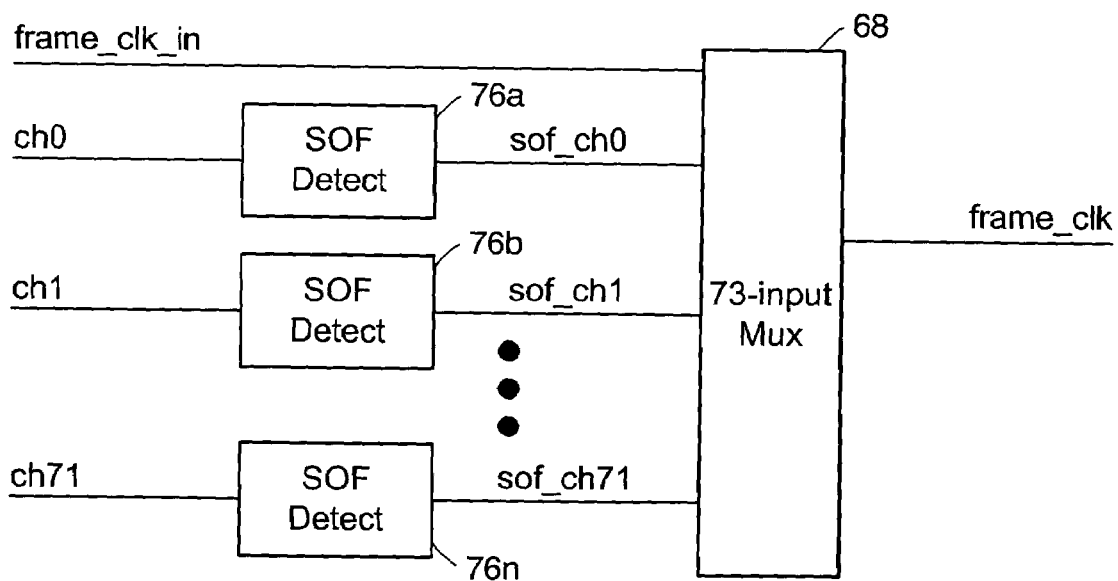
FIG. 12

TIME SLOT INTERCHANGER

RELATED APPLICATION(S)

This application claims the benefit of U.S. Provisional Application No. 60/237,086 filed Sep. 28, 2000 and U.S. Provisional Application No. 60/195,998 filed Apr. 11, 2000. The entire teachings of the above applications are incorporated herein by reference.

BACKGROUND OF THE INVENTION

Telecommunications channels often carry traffic that is multiplexed from several sources. For example, a 2.488 Gb/s SONET STS-48 channel carries 48 51.84 Mb/s SONET STS-1 channels that are time multiplexed on a byte-by-byte basis. That is, the channel carries bytes 1.1, 2.1, 3.1, ..., 48.1, 1.2, 2.2, 3.2, ..., 48.2, 1.3, 2.3, 2.3, ... where n.m denotes byte m of subchannel n. Details of the SONET format can be found in Ming-Chwan Chow, Understanding SONET/SDH: Standards & Applications, Andan Pub, ISBN 0965044823, 1995 and in ANSI Standard T1.105-1995.

An STS-1 SONET frame is a repeating structure of 810 bytes arranged into 9 rows of 90 columns. The frame structure is transmitted in row-major order. That is, all 90-bytes of row 0 are transmitted, then all 90 bytes of row 1, and so on. At higher multiplexing rates, each byte of the STS-1 frame is replaced by a number of bytes, one from each of several multiplexed sources. For example, at STS-48, 48 bytes, one from each of 48 STS-1 subframes, are transmitted during each column interval. In this case, the order of transmission is to send all 48 subframe bytes for one column before moving on to the next column and to send all of the columns of a row before moving on to the next row.

A digital cross connect is a network element that accepts a number of multiplexed data channels, for example 72 STS-48 channels, and generates a number of multiplexed output channels where each output channel carries an arbitrary set of the subchannels from across all of the input ports. For example, one of the STS-48 output channels may contain STS-1 channels from different input channels in a different order than they were originally input.

An example of digital cross connect operation is shown in FIG. 1. The figure shows a cross connect 30 with two input ports and two output ports. Each of these ports contains four time slots. Input port 1 (the top input port) carries subchannels A, B, C, and D in its four slots and input port 2 (the bottom port) carries subchannels E, F, G, and H in its four time slots. Each time slot of each output port can select any time slot of any input port. For example, output port 1 (top) carries subchannels H, D, F, and A from 2.4, 1.4, 2.2, 1.1 where x.y denotes input port x, timeslot y. Input timeslots must be switched in both space and time. The first time slot of output port 1, for example must be switched in time from slot 4 to slot 1 and in space from port 2 to port 1. Also, some time slots may be duplicated (multicast) and others dropped. Subchannel A, for example, appears in output time slots 1.4 and 2.2 and subchannel G is dropped, appearing on no output time slot.

A digital cross connect can be implemented in a straightforward manner by demultiplexing each input port, switching all of the time slots of all of the input ports with a space switch, and then multiplexing each output port. This approach is illustrated in FIG. 2. The four time slots of input port 1 are demultiplexed (Demux) in demultiplexers 32 so that each is carried on a separate line. All of these demultiplexed lines are then switched by a space switch 34 to the appropriate output time slots. Finally, a set of multiplexers (Mux) 36 multiplexes the time slots of each output channel onto each output port. This approach is used, for example, in the systems described in U.S. Pat. Nos. 3,735,049 and 4,967,405.

The space-switch architecture for a digital cross connect as shown in FIG. 2 has the advantage that it is conceptually simple and strictly non-blocking for arbitrary unicast and multicast traffic. However, it results in space switches that are too large to be economically used for large cross connects. For example, a digital cross connect with P=72 ports and T=48 time slots requires a PT×PT (3456×3456) space switch with $P^2T^2$=11,943,936 cross points. Further, this large switch will be operated at a very slow rate. It will only need to switch a new batch of input time slots after T bytes have been received. Thus, it operates at 1/T the byte rate.

A more economical digital cross connect can be realized using a time-space-time (T-S-T) switch architecture as illustrated in FIG. 3. Here each input port is input to a time-slot interchanger (TSI) 38. A TSI switches a multiplexed input stream in time by interchanging the positions of the time slots. To switch time-slot i to time-slot j, for example, slot i is delayed by T+j−i byte times. The multiplexed streams out of the input TSIs are then switched by a P×P space switch 40 that is reconfigured on each time slot. The outputs of this space switch are switched in time again by a set of output TSIs 42. This T-S-T architecture is employed, for example, by the systems described in U.S. Pat. Nos. 3,736,381 and 3,927,267.

An example of the operation of a T-S-T digital cross connect on the configuration of FIG. 2 is shown in FIG. 4. Here the TSI for input port 1 does not change the positions of its input time slots. The input TSI for port 2, however, reorders its time slots from E, F, G, H, to -, F, H, E. The G here is dropped as it is not used by any output ports. The space switch takes the outputs of the two input TSIs and switches them, without changing time slots, to create the streams A, F, H, D and A, B, C, E. Note that this involves a multicast of timeslot A to both outputs. Finally, the output TSIs reorder these streams to give the output streams H, D, F, A and E, A, B, C.

A three-stage T-S-T digital cross connect is logically equivalent to a 3-stage Clos network with P T×T input stages, T P×P middle stages, and P T×T output stages. To route a configuration of input time slots to output time slots on such a switch a middle-stage time slot must be assigned to each connection. This routing is described in detail in Clos, Charles, "A Study of Non-Blocking Switching Networks", Bell System Technical Journal, March 1953, pp. 406-424, and V. E. Benes, "On Rearrangeable Three-Stage Connecting Networks", The Bell System Technical Journal, vol. XLI, No. 5, September 1962, pp. 1481-1492. These references show that a 3-stage Clos network, and hence a T-S-T digital cross connect, is rearrangeably non-blocking for unicast traffic but cannot, in general route multicast traffic.

A network is rearrangeably non-blocking, or rearrangeable, for unicast traffic, if for every input to output permutation, there exists an assignment of middle stage time slots that will route that permutation. A network is strictly non-blocking if an existing configuration can be augmented to handle any new connection between an idle input time slot and an idle output time slot without changing the time slots assigned to any existing connection.

From its input and output terminals, a rearrangeable network is indistinguishable from a strictly non-blocking network if its configuration changes are (1) aligned to the start of a frame and (2) frame synchronized so that all TSIs and space switches switch their configurations at the start of the same frame. Such frame synchronized switching is referred to as hitless because it does not hit or corrupt the contents of any frames. There is no impact of rearranging existing connections as long as such rearrangement is hitless. Thus, with hitless switching, there is little advantage to strictly non-blocking switches. Hitless switching is provided in Lucent 800 and 900 series digital cross connects (see http://www.chipcenter.com/telecommunications/mdp/webscan/mn00e/mn00e016.htm; http://connectivity1.avaya.com/exchangemax/).

SUMMARY OF THE INVENTION

A typical system includes a FIFO which aligns input data with a global frame clock before that data is then read into a time slot interchanger. In accordance with the present invention, frame alignment and time slot interchange are both implemented in a single module. An interchange random access memory receives an input data frame, out of alignment with a global frame clock, at an input. A write address generator addresses the random access memory to write subframes, out of alignment with the global frame clock, in a received order. A read address generator addresses the random access memory to read subframes in interchanged order and aligned to the global frame clock.

In particular embodiments, the read address generator transforms a global frame counter to generate the read address. The global frame counter may be transformed in a random access memory. The write address generator may generate the address from a local frame counter synchronized to the input data frame.

The interchange random access memory may form N greater than 2 buffers, the local frame counter being between one and N−1 buffer lengths ahead of the global frame counter. In one embodiment, the input data frames are SONET STS-M frames, and the interchange random access memory comprises three buffers, each of M bytes. A local frame counter includes a modulo three counter field which selects one of the three buffers. In one embodiment M equals 48.

The interchange random access memory may be noncontiguously addressed. A predecoder maps address space to instantiated locations in the random access memory. The predecoder may include at least one n-to-($2^n$−p) decoder for some integers n and p.

Preferably, the time slot interchanger is included in a digital cross connect comprising plural switching stages. Each stage has plural switches receiving plural frames of time multiplexed input data, and the switches switch the data in time and space.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 11A illustrates a frame counter for the digital cross connect of FIG. 7, and FIG. 11B illustrates a single field of the counter of FIG. 11A.

FIG. 12 illustrates a frame clock selector used in the digital cross connect of FIG. 7.

DETAILED DESCRIPTION OF THE INVENTION

A description of preferred embodiments of the invention follows.

Figure 5:
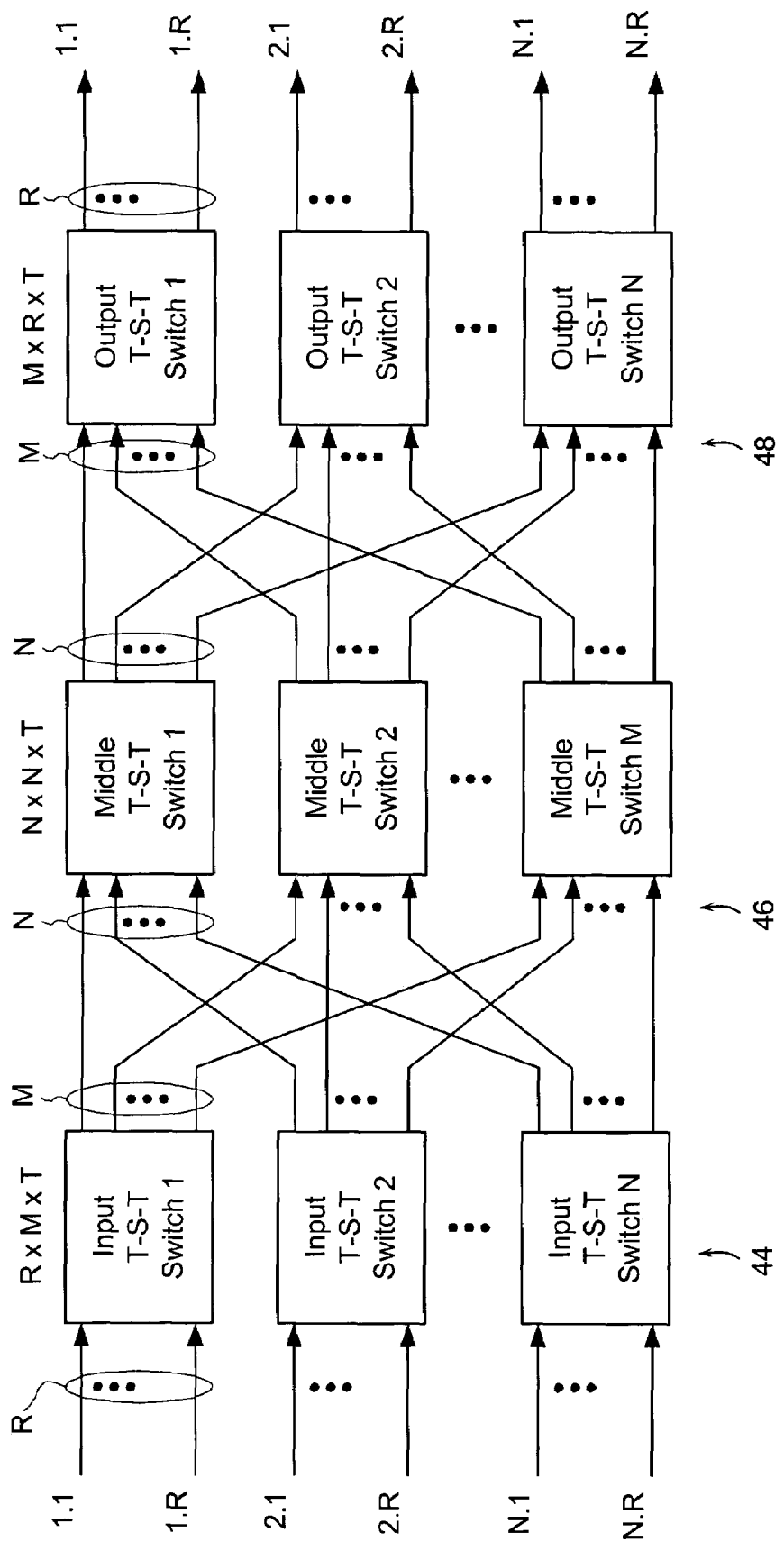
FIG. 5 illustrates a multistage digital cross connect embodying the present invention.

To realize very large digital cross connects, it is advantageous to cascade a number of T-S-T switches in multiple stages. For example, FIG. 5 shows an NR port by T time-slot digital cross connect constructed from three T-S-T stages. The switch consists of N R×M input stages 44, M N×N middle stages 46, and N M×R output stages 48 where M is the number of middle-stage switches. With a current product, it is easy to configure switches with M up to 48 as three-stage switches. Larger configurations are possible with 5-stage switches, for example.

Each of the stages switches multiplexed channels that each contain T time slots. In effect, the switch is a T-S-T-T-S-T-T-S-T switch. However, back-to-back TSIs are redundant, so the output TSI on the input stage and the input TSI on the output stage are configured straight through and the switch is actually a T-S-T-S-T-S-T switch.

Hitless switching is particularly difficult in networks that are composed of multiple stages of T-S-T switches. The configuration of all TSIs and all space switches must be switched at the start of the same frame. Note that this start of frame occurs at different times in different stages.

The present embodiment provides hitless configuration of a digital cross connect composed of an arbitrary number of T-S-T stages. This is accomplished through the following process.

1. The new configuration is loaded into a standby configuration table. The on-chip RAMs that hold the configurations for each TSI and space switch are double buffered containing a primary table and a standby table. Thus, the new configuration can be loaded without disturbing operation of the switch.
2. Configuration switch indication is provided to the master middle stage switch, an arbitrary middle-stage switch that has been designated as the master. Alternatively, the configuration switch indication could be applied to a first stage. Because all first stages connect to all middle stages, this information could be propagated downstream from anywhere upstream of the middle stage. It could not, however, be applied to a last stage without an additional step in the distribution.
3. The master middle stage switch propagates a prepare-to-switch (PTS) signal to all downstream stages. Because each middle stage is connected to all switches in the output stage, this PTS signal reaches all output switches.

The PTS signal carries two bits of information (1) that the signal is present, and (2) which configuration should be selected. The presence indication is needed to distinguish channels received from the master from channels received from non-master middle stages that do not carry PTS signals.

The PTS signal may be carried on a separate wire, may be carried out-of-band on the same wire or wires as the data, or may be embedded in the data by replacing redundant data. In the preferred embodiment, this signal is embedded in the data by replacing two of the 48 A1 bytes of an STS-48 SONET frame with a PTS signal. The second A1 byte of the frame is inverted (from a hex F6 to a hex 09) to signal the PTS is present, and the third A1 byte of the frame carries the selected configuration repeated in all 8 bits of the byte (i.e., 00 selects configuration 0 as primary and FF selects configuration 1 as primary). These A1 bytes are restored to their fixed value before the SONET frame leaves the last stage of the switch.

4. All switches downstream from the master middle-stage switch that receive a PTS indication on any input propagate this indication on all output ports. This propagation eventually reaches all last-stage switches.
5. Each last stage switch in the network passes the PTS indication to the corresponding first stage switch of the network. This signaling can be accomplished over dedicated wiring. In the preferred embodiment, the corresponding first-stage switch and last-stage switch are realized on the same integrated circuit so this connection does not require any external signals.
6. At the start of the next frame, each first stage switch (1) switches its configuration, swapping the primary and standby tables, and (2) sends a configure select (CNS) signal on all output ports. The CNS signal simply identifies which configuration should be selected as primary. There is no need for a presence or valid indication since all internal channels carry valid CNS indications.

As with the PTS signal, the CNS signal may be carried on a separate wire, carried out of band on the data wire or wires, or embedded in the data. In the preferred embodiment, the CNS signal is embedded in the data by replacing one of the A1 bytes of an STS-48 SONET frame. In particular the selected configuration is repeated in all 8 bits of the fourth A1 byte of the frame.

7. As each switch receives a frame with a CNS indication, it switches its primary configuration to the one specified in the CNS signal at the start of the frame and propagates the CNS signal on all of its outputs. Each switch is able to switch its configuration on the same frame that carries the CNS signal because there is a significant delay (48 to 96 cycles in the preferred embodiment as discussed below) from the time the frame arrives at the switch and the time the first TSI must be switched at the start of the frame. The last stage switches do not propagate the CNS signal. In the preferred embodiment (where A1 bytes are borrowed for both PTS and CNS signals) the last stage switches restore the proper A1 value (hex F6) to all three borrowed bytes.

This seven stage process performs a synchronized configuration switch across all TSIs and space switches of a multi-stage digital cross connect in response to a single user command to the master middle-stage switch. In the preferred embodiment, the PTS and CNS signaling is embedded in the data so that the synchronized configuration switching is performed without adding any new signals to the cross connect.

Figure 6:
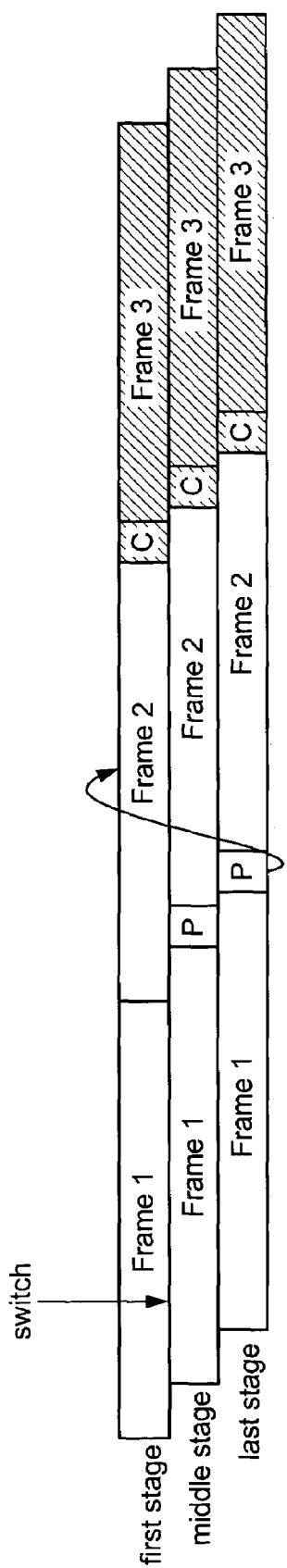
FIG. 6 illustrates a timing diagram for operation of the digital cross connect of FIG. 5.

The timing of the configuration switch operation is illustrated in the Gantt chart of FIG. 6. The chart shows three SONET frames propagating through three stages of a multistage digital cross connect. Each row of the figure is offset from the preceding row to denote the delay of a frame in passing through a stage. Note that this offset is not to scale, but rather is exaggerated for clarity. In the preferred embodiment, each stage delays the SONET frame by 96 to 144 byte times (2-3 SONET columns or 308 to 463 ns) which is a small fraction of the 38880 bytes (125 us) in an STS-48 SONET frame.

The sequence begins when the master middle-stage switch receives a request to change configuration while it is handling frame 1. The master middle-stage switch responds to this request by embedding a PTS signal, denoted by P in the figure, in the 2nd and 3rd A1 bytes of frame 2. This PTS signal is propagated to all last-stage switches as illustrated in the third row of the figure. After each last-stage switch receives the PTS signal, it passes the selected configuration, from the 3rd A1 byte of frame 2, to the corresponding first-stage switch which in the preferred embodiment is located on the same chip. Each first-stage switch responds to this selected configuration signal by switching its configuration at the start of frame 3, as denoted by the cross-hatched portion of the figure, and by embedding a CNS signal, denoted by C in the figure, in the 4th A1 byte of frame 3. As frame 3 propagates through each stage, that stage switches its configuration at the start of frame 3 and propagates the CNS signal to downstream stages.

Figure 7:
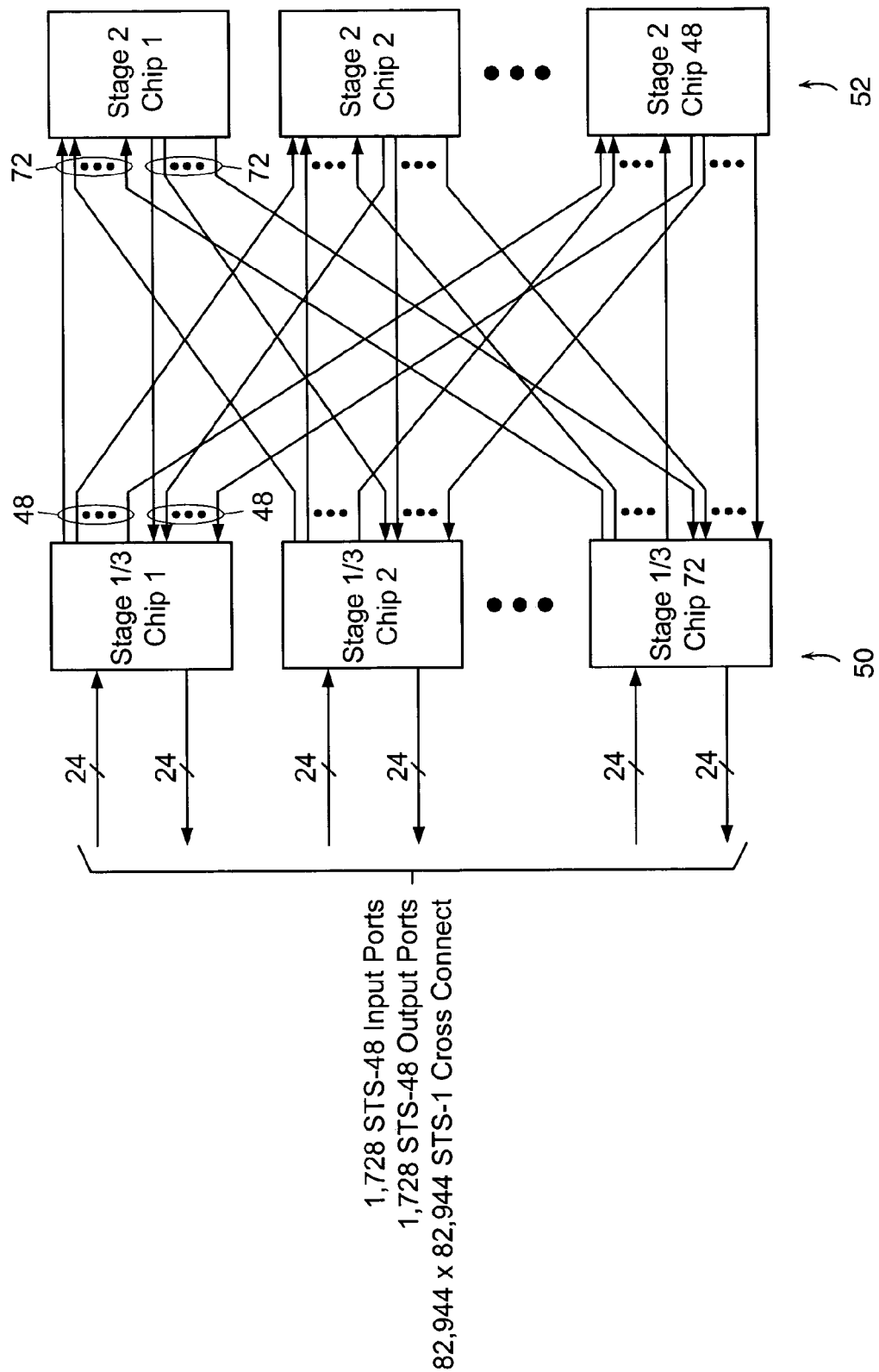
FIG. 7 illustrates an embodiment of the invention in which input and output stages of the digital cross connect share common chips.

A block diagram of the preferred embodiment of a multi-stage digital cross connect incorporating the present invention is illustrated in FIG. 7. The figure shows a three-stage digital cross connect that accepts 1,728 STS-48 input ports and drives 1,728 STS-48 output ports. It switches time slots at the STS-1 level between the input ports and output ports. The system of FIG. 7 contains 120 identical 72×72×STS-48 T-S-T digital cross connect chips: 72 chips 50 are used for the first and last stage switches in the left column of FIG. 7 while 48 chips 52 realize the middle-stage. Each of the 72 chips in the left column of FIG. 7 uses 24 of its 72 inputs and 48 of its 72 outputs to realize a 24×48×STS-48 first-stage switch. The same chip uses its remaining 48 inputs and 24 outputs to realize a 48×24×STS-48 last-stage switch.

Realizing the first and last stages of the switch on a single chip has two advantages. First, this enables the selected configuration signal to be passed on chip from the last stage to the first stage eliminating the need for an off-chip signal. Second, this configuration makes more efficient use of the input and output ports. The first-stage switch is expanding, having twice as many outputs as inputs, while the last-stage switch is concentrating, having twice as many inputs as outputs. If the first-stage and last-stage switches were realized on separate chips, half of the input ports would be idle on the first-stage switch and half the output ports would be idle on the last-stage switch. By combining a first-stage switch and a last-stage switch on a single chip, the demands for input and output ports are balanced and no ports are left idle.

Figure 8:
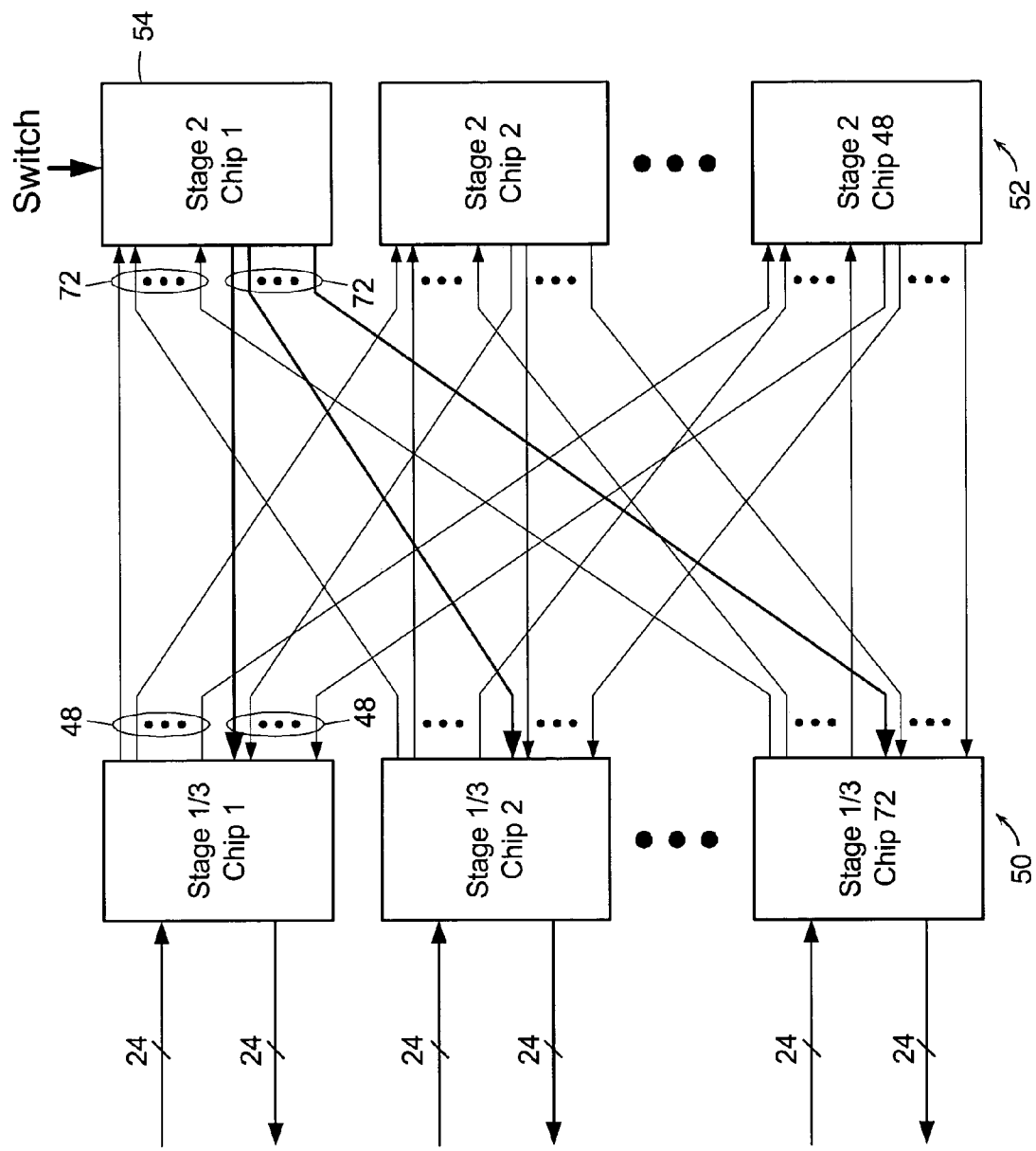
FIGS. 8-10 illustrate the propagation of configuration information through the digital cross connect of FIG. 7.
Figure 9:
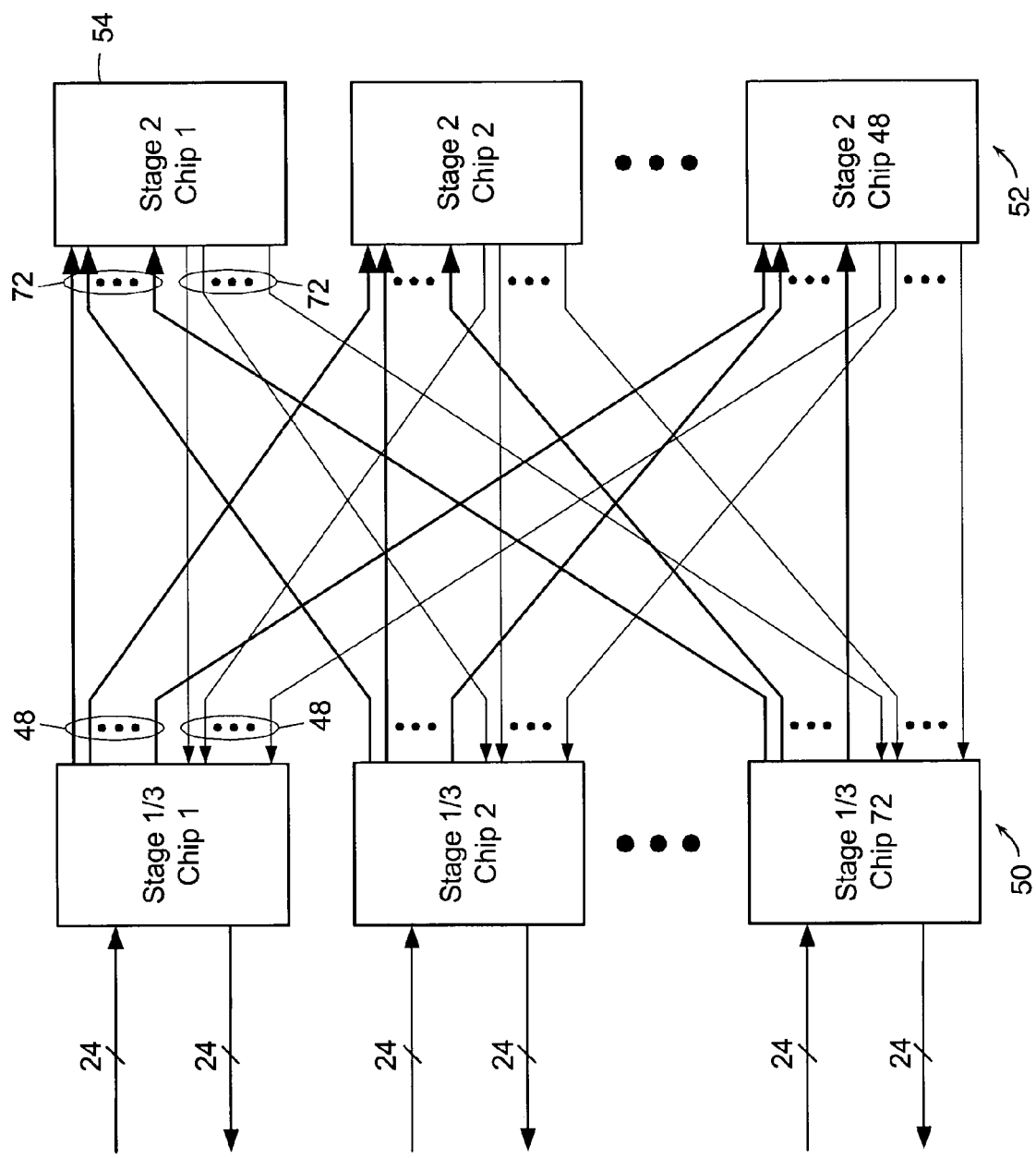
Figure 10:
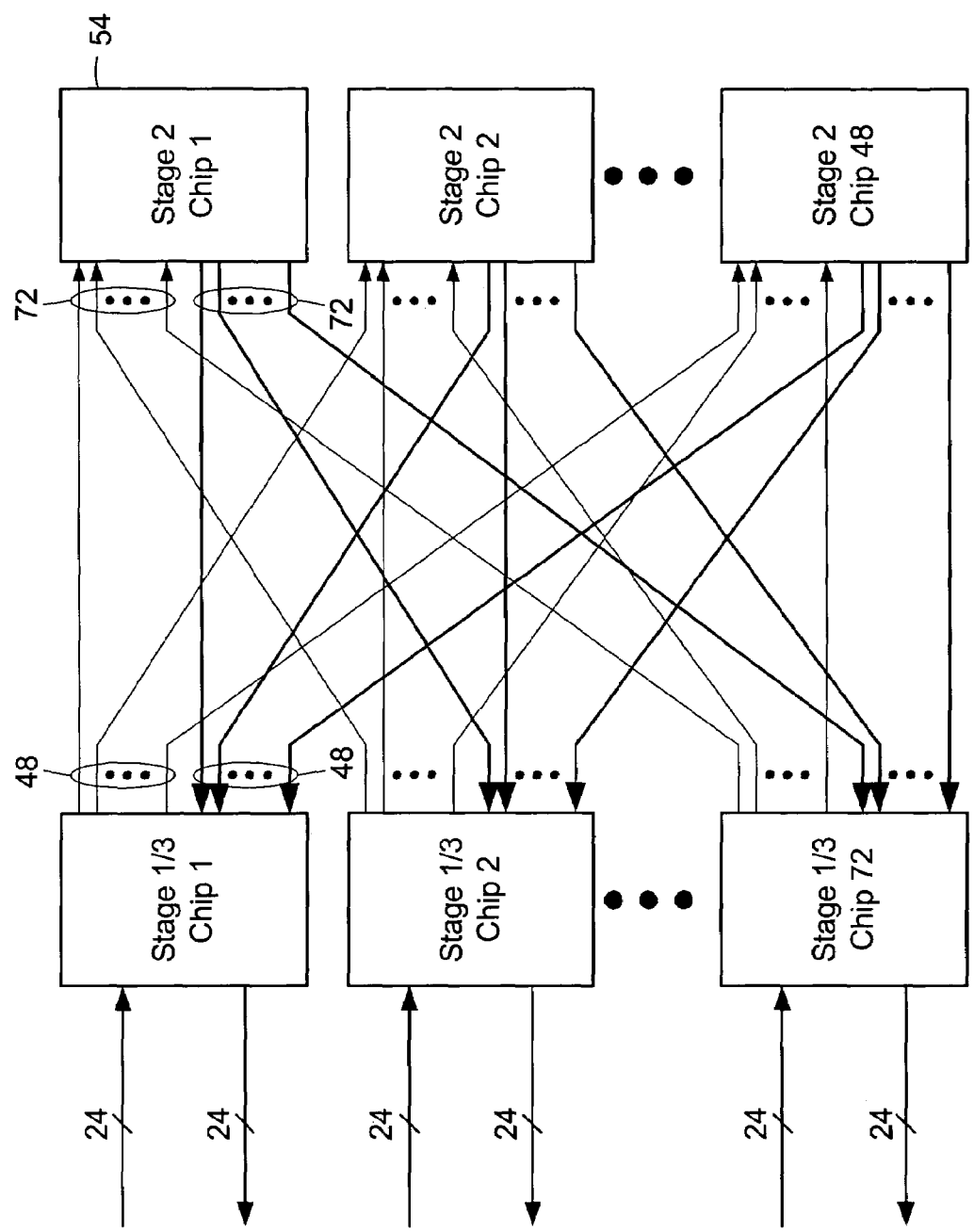

The sequence of the synchronized configuration change on the system of FIG. 7 is illustrated in FIGS. 8 through 10. In FIG. 8, the master middle-stage switch 54, stage 2 chip 1 at the top of the right column of chips 52, receives a configuration change request and sends a PTS signal over its 72 output links to all 72 chips in the left column. The propagation of the PTS signal is illustrated by the bold lines in the figure. Because the master middle-stage switch is connected to all chips in the left column, each left column chip receives this PTS signal.

FIG. 9 shows the propagation of the CNS at the start of the next frame. The input switch portion of all left column switches send a CNS signal over each of their 48 output links. Each of the 48 middle-stage switches receives 72 copies of this CNS signal. Again, the bold lines denote links carrying the new CNS signal. Finally, FIG. 10 shows the propagation of the CNS signal from the middle-stage switches to the output portion of the left column switches. Each last-stage switch receives 48 copies of this signal, one from each middle-stage switch.

Frame Clock Distribution in a Multi-stage Cross Connect

In a multi-stage digital cross connect such as those shown in FIGS. 5 and 7, it is necessary to distribute a frame clock to each switching component in each stage. For example, in a SONET cross connect, each switching component must receive an 8 kHz frame clock signal, corresponding to the 8 kHz SONET frame rate.

The internal operations of the cross connect are sequenced by a frame counter, synchronized to the frame clock, that sequences the 38,880 bytes within each frame. The frame counter is typically divided into three fields corresponding to the row (0-8), column (0-89), and subframe (0-48) within the SONET frame. A particular byte of the frame is present on an internal bus of the cross connect when the counter value is equal to the position of that byte within the frame. For example, the B1 parity byte is present when the counter reads 2.0.0 corresponding to row 2, column 0, and subframe 0. The frame counter is synchronized by the frame clock so that the count starts with all fields zero (a count of 0.0.0) on the rising edge of the frame clock.

FIG. 11A illustrates the frame counter for the digital cross connect of the disclosed embodiment. To facilitate addressing three-buffer memories discussed below, we group the columns into three-column groups and thus represent the column position, a number between 0 and 89, by combining a column group, a number between 0 and 29, with the column within the group, a number between 0 and 2. The counter of FIG. 11A is divided into four fields: row 56, colgroup (column group 58), column 60, and subframe (sts) 62. The column field is divided into column (0-2), and column group (0-29) to facilitate sequencing the combined frame alignment FIFO and time-slot interchanger as described below. With this four field counter, the B1 parity byte is present when the counter reads 2.0.0.0: row 2, column group 0, column 0, and subframe 0.

Each field of the counter accepts three input signals: reset, inc, and clk, and produces two outputs: count and limit, as illustrated by the field 64 of FIG. 11B. All other inputs and outputs are synchronous to the clk signal. Inputs are sampled on the rising edge of clk, and outputs change in response to the rising edge of clk. When the reset signal is asserted, the count output is reset to zero on the next rising edge of clk. When the increment signal is asserted, the counter increments the count output on the next rising edge of clk. When the count reaches its final value (e.g., 8 for the row counter), the limit signal is asserted and the count resets to zero on the next rising edge of the clock.

The frame counter of FIG. 11A synchronizes to the incoming frame clock via a delay block 66. The delay block delays the frame clock by a predetermined number of byte clocks and converts it to a pulse that lasts for a single cycle of the byte clock. The output of the delay block is an advanced start-of-frame (sof) signal that resets all fields of the frame counter. The frame counter then advances on each rising edge of the byte clock. The subframe (sts) field advances on every byte clock. When the subframe field reaches its limit count (sts=47), the increment line to the column counter is asserted. On the next edge of the byte clock the subframe field rolls over to zero and the column field increments. Similarly the column group field increments when the column field rolls over and the row field increments when the column group field rolls over. In this manner the frame counter sequences out an entire 125 µs SONET frame. When the counter is properly synchronized, the terminal count (8.29.2.47) is reached during the same cycle that the sof signal is asserted making the sof signal redundant.

The "byte clock" for a given chip must be "mesochronous" with the byte clocks for all of the other chips. That is, it must have exactly the same frequency but can have an arbitrary phase (no skew requirements). Typically the byte clock originates at a pair of master oscillators. The two master oscillators are on separate cards, so one can be replaced while the other is running. The two master oscillator signals are distributed via dedicated cables throughout the system. On each circuit card a local oscillator is slaved to the selected master oscillator. If that master fails, the local oscillator continues running while it is automatically switched to be slaved to the other master oscillator.

In a multi-stage switch, the distribution of the frame clock should match the distribution of the data signals so that as data signals are delayed they remain properly aligned to the frame clock. In the present embodiment, this distribution is accomplished by propagating the frame clock along paths identical to the data signals. As with the configuration switching signal, the frame clock can be propagated along a dedicated wire that follows the same path as the data wires, it can be carried out-of-band on the data wire or wires, or it can be encoded in-band in the data signal. The frame timing can be embedded in the data signal by modifying the signal to carry this timing or can just be derived from the data signal by using known patterns in the signal to extract the timing. In one embodiment using the latter approach and discussed below, when a SONET input is selected as the frame clock, the clock transition occurs on the first byte of the frame, the first A1 byte.

In the disclosed embodiment, each cross connect component maintains two frame counters. Each frame counter can be synchronized to a frame clock that is derived from either an external frame clock input, or to the start of frame on any of the 72 inputs to the component. The selection of the frame clock for one of the two frame counters is made by a 73-input multiplexer 68 as shown in FIG. 12. The multiplexer selects between an external frame clock, frame_clk_in, and one of 72 start of frame signals, one from each SONET input. The start-of-frame signal for input n, sof_chn, has a rising edge that coincides with the appearance of the first A1 framing byte on SONET input n.

The start-of-frame signals are derived from the data frames on incoming channels through respective start-of-frame select logic 76a-76n. In a SONET STS-N frame, there are N A1 bytes each of which has a fixed value of hexadecimal F6. These are followed by N A2 bytes each of which has a fixed value of hexadecimal 28. The start-of-frame logic looks for the F6 28 boundary and synchronizes a respective local frame counter 74 (FIG. 15) so that it is at the appropriate count (0,0,1,0) on the first A2 byte. The start-of-frame pulse is then generated from this counter when it is at the first A1 byte position (0,0,0,0). The local frame counter 74 has the same structure as the global frame counter of FIG. 11A, but is synchronized to the local start-of-frame, not the global frame_clk.

Looking for the A1A2 boundary is preferred since the last bytes of the previous frame can be any value, including F6. Hence finding 48 F6 bytes does not guarantee that the 48 A1 bytes have been found. Finding several F6 bytes followed by several 28 bytes does, with high probability, guarantee that you have found the A1 A2 boundary. More specifically, to make sure that it stays properly framed in the presence of errors, the start of frame select logic 76 uses a simple finite state machine (FSM) that keeps track of framing. To acquire framing, the FSM must see the F6 28 pattern twice in the same position. Once acquired, the local frame counter holds this framing until the expected F6 28 pattern is missed four times. This behavior is specified in Bellcore specification GR-253 which is incorporated by reference in its entirety.

Providing two frame counters facilitates using a single component to implement both an input and output stage of a multistage switch as shown in FIG. 7. In this case, input and output channels associated with the input stage of the multistage switch are synchronized to a first counter, frame counter A, and input and output channels associated with the output stage of the multistage switch are synchronized to a second frame counter, frame counter B. This permits the input frames and the output frames to start at different points in time as illustrated in FIG. 6.

Allowing the frame clock for each frame counter to be derived from an input enables the frame clocks for a multi-stage digital cross-connect system to be distributed embedded in the SONET signals themselves. The distribution follows a pattern identical to that used to distribute the configuration switch signal as illustrated in FIGS. 8 through 10. The master middle-stage cross-connect chip 54 (Stage 2, Chip 1 in the figures) selects an external frame clock to synchronize its frame counter. Alternatively, the master could instead synchronize itself to an incoming frame. In this case one of the input lines is being designated as the reference 8 kHz source that is being used to provide frame synchronization to the entire system. Because it is a middle-stage chip, all of the input channels of master chip 54 are frame aligned (to within the alignment FIFO tolerance) and hence it uses only one of its two frame counters. The master middle-stage chip then distributes this frame timing embedded in its output signals as illustrated by the bold lines in FIG. 8. This distribution provides a global frame clock to every stage 1/3 chip.

Each stage 1/3 chip selects this global frame clock by configuring the multiplexer of FIG. 12 to select the sof_ch1, the start-of-frame signal from the input channel connected to the master middle-stage switch as the source of both of its frame clocks. Different delay values are programmed into the delay element of FIG. 11 for the two frame counters on the stage 1/3 chips to account for the difference in timing between the ports used for stage 1 and the ports used for stage 3. The stage 1 outputs then distribute this timing back to the remaining middle stage (stage 2) chips as illustrated by the bold lines in FIG. 9.

The non-master middle stage chips (Stage 2 Chip 2 through Stage 2 Chip 48 in FIGS. 8 through 10) select one of the frame clocks distributed over the stage 1 outputs by configuring the multiplexer of FIG. 12 to select any of the sof_chn signals.

At this point, the frame clock has been distributed to every chip in the system and all of the frame counters can be synchronized by programming the appropriate delay value into the delay element of FIG. 11. Each non-master middle stage switch then distributes a redundant copy of the frame clock to all stage 1/3 chips embedded on their output signals as illustrated by the bold lines in FIG. 10. These redundant clocks allow the stage 1/3 chips to switch to an alternate frame clock source should the link from the master middle stage chip become disabled.

One skilled in the art will understand that many variations on this frame clock distribution method are possible. For example, to provide tolerance to any single point of failure, two or more middle-stage switches (e.g., Stage 2 Chips 1 and 2) may both select external frame clocks to synchronize their respective counters and distribute independent frame clocks over their output signals to the stage 1/3 chips.

Frame Alignment Integrated with a Time-slot Interchanger

All input channels to a digital cross connect must have their frames aligned so that when a particular byte, say the B1 byte, of one frame is input to the cross connect the same byte of all other frames is input to the cross connect. Further, since there may be skew in the cabling between the chips of one stage (e.g., the input stage) and the chips of the next stage (e.g., the middle stage), alignment may be provided in all stages, not just the input stage. In practice this alignment is accomplished in two steps. First, an external circuit aligns the input frames to start within a small window centered at a fixed offset from this frame clock signal. Then a small FIFO buffer within the cross connect is used to bring the input frames into exact byte alignment.

Figure 13:
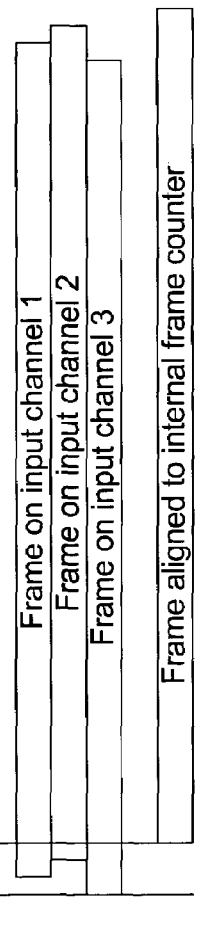
FIG. 13 illustrates the potential timing of three input frames and an output frame from a time-slot interchanger (TSI) embodying the present invention.

FIG. 13 shows a Gantt chart illustrating the second step of this frame alignment process. The figure shows three frames arriving on three (of 72) different channels at a digital cross-connect component and one frame aligned to the internal frame clock. This frame represents the timing of all channels after the alignment FIFO. All input frames are aligned so that their start of frame (the first A1 byte of a SONET frame) occurs within a small window of time, 48 byte times or about 150 ns in the preferred embodiment, before start of frame on the internal frame counter. One skilled in the art will understand that this window can be made larger or smaller depending on alignment tolerances. The internal frame counter is configured to set this window. As described above, this counter can be synchronized to one of the input channels or to an external frame clock with a start-of-frame delay programmed so that all input channels fall within the window.

Figure 14:
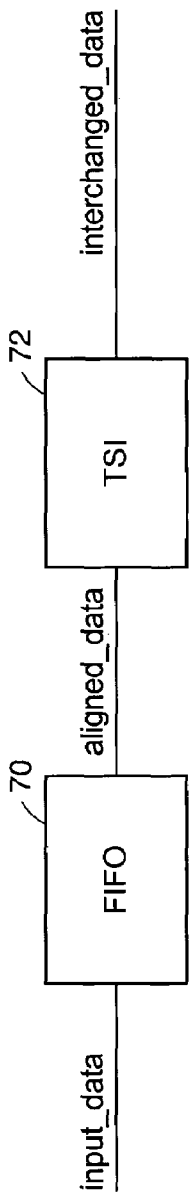
FIG. 14 illustrates a prior art use of a FIFO in conjunction with a TSI.

FIG. 14 shows how prior art cross connects have used a FIFO 70 separate from the TSI function 72 to perform frame alignment. Input data is written into the FIFO with the frame timing of the input channel (e.g., one of the top three boxes in FIG. 13). Aligned data is read out of the FIFO with frame timing aligned to the internal frame counter. The aligned data is then written into a time-slot interchanger (TSI) and interchanged data is read out of the TSI function with time slots appropriately reordered. Most TSIs have been implemented with RAMs; typically, the input was addressed with the global frame counter and the output was addressed with a permutation indexed by the global frame counter.

Figure 15:
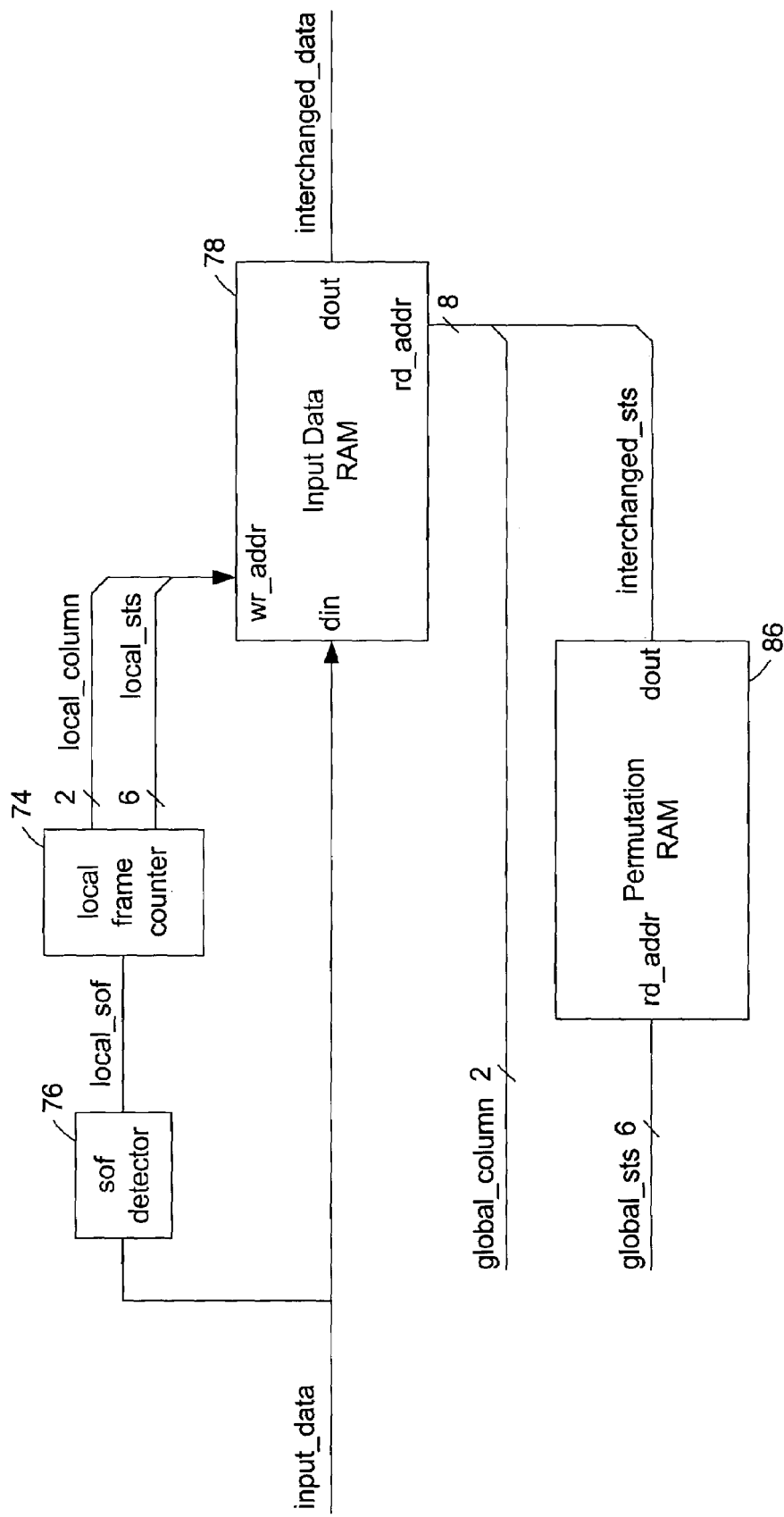
FIG. 15 illustrates a TSI which performs frame alignment in accordance with the present invention.
Figure 16:
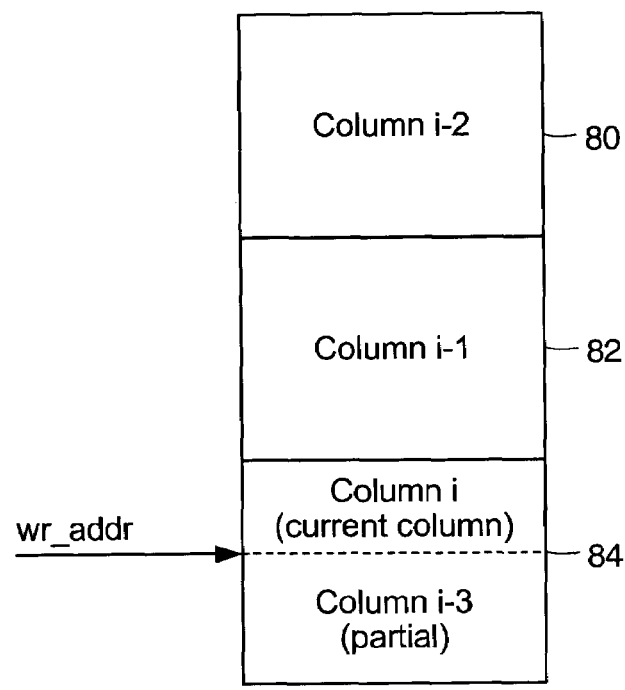
FIGS. 16-18 illustrate read and write operations with respect to three buffers in the RAM of the TSI of FIG. 15.

In the preferred embodiment, each channel performs both frame alignment and time-slot interchange in a single module that writes data into only a single RAM as illustrated in FIG. 15. This approach saves area and power by eliminating a redundant RAM and the redundant read and write operations that are required with the approach of FIG. 14. With this approach, each input channel contains a local frame counter 74 that is synchronized to the start of frame on the input data via a start-of-frame detector 76. Thus, the input is addressed with a local frame counter that may lead the global frame counter by up to 48 byte times. The local frame counter generates only the 2-bit (modulo 3) column and 6-bit (modulo 48) subframe fields: local_column, and local_sts respectively. These two fields are concatenated to form an 8-bit write address for the input data RAM 78. During each byte time, input data is written to the RAM 78 at the location specified by this address. Hence, the RAM contains three column buffers of data with 48 bytes (one byte per subframe) in each column buffer. As illustrated in FIG. 16, at any point in time, these three buffers 80,82,84 contain a portion of the current column (column i) and all of the last two columns (columns i-1 an i-2).

Note that while the RAM is addressed with an 8-bit address (256 possible values), only 144 locations in the RAM are used since the six sts bits (64 possible values) need only define 48 bytes, and these 144 locations do not occur at contiguous addresses. In hexadecimal notation, only locations 0-2F, 40-6F, and 80-AF are used. Below we describe how we exploit this sparse usage pattern by building a non-contiguously addressed RAM to economize on RAM area and power.

Figure 1:
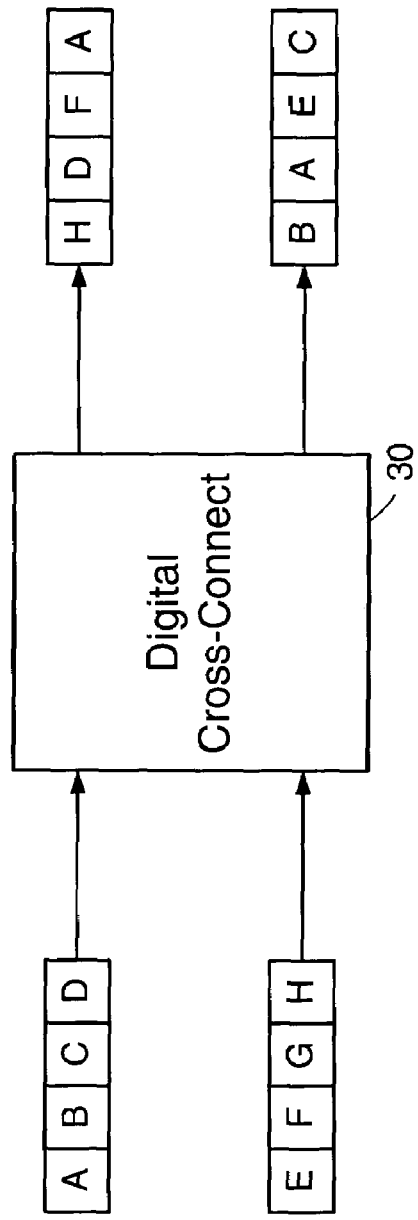
FIG. 1 illustrates operation of a prior art digital cross connect.
Figure 2:
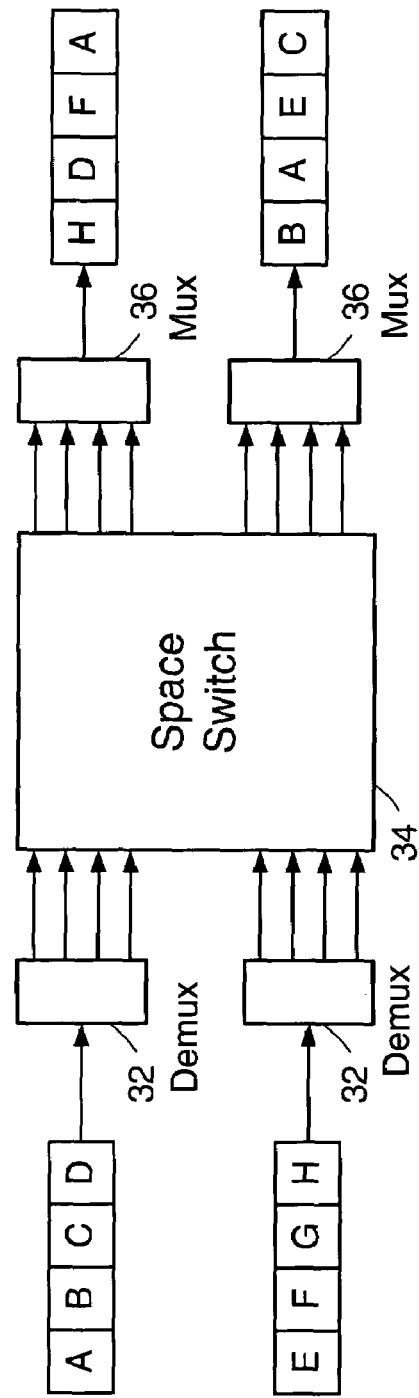
FIG. 2 illustrates a prior art digital cross connect with a space switch and multiplexers.
Figure 3:
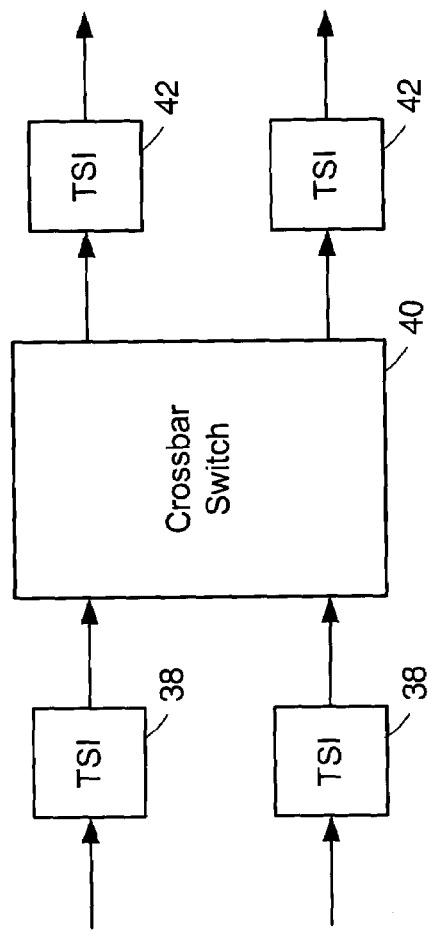
FIG. 3 illustrates a prior art digital cross connect using time-slot interchangers.
Figure 4:
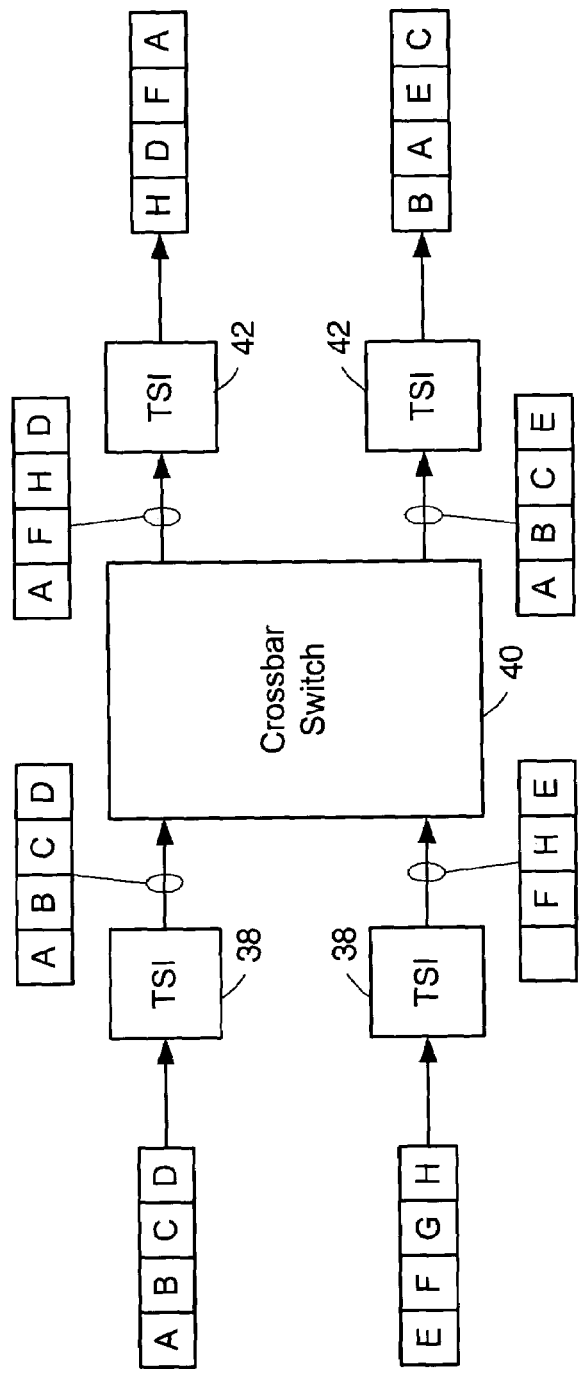
FIG. 4 illustrates operation of the digital cross connect of FIG. 3.

The time-slot-interchange function is performed under control of the low two fields of the global frame counter (global_column and global_sts) using the read port of the input data RAM as illustrated in FIG. 15. To interchange subframes, the subframe field of the global frame counter is translated using a 48-byte permutation RAM to generate a 6-bit interchanged subframe, interchanged_sts, signal. Each location, a, in the permutation RAM 86 contains the input subframe number that is to be placed into output subframe a on interchanged data. For example, to place input subframe 0 into interchanged subframe 3 (as in the bottom left corner of FIG. 4), the value 0 is stored in location 3 of the permutation RAM. The interchanged subframe signal out of the permutation RAM is concatenated with the global column field to generate the read pointer.

Figure 17:
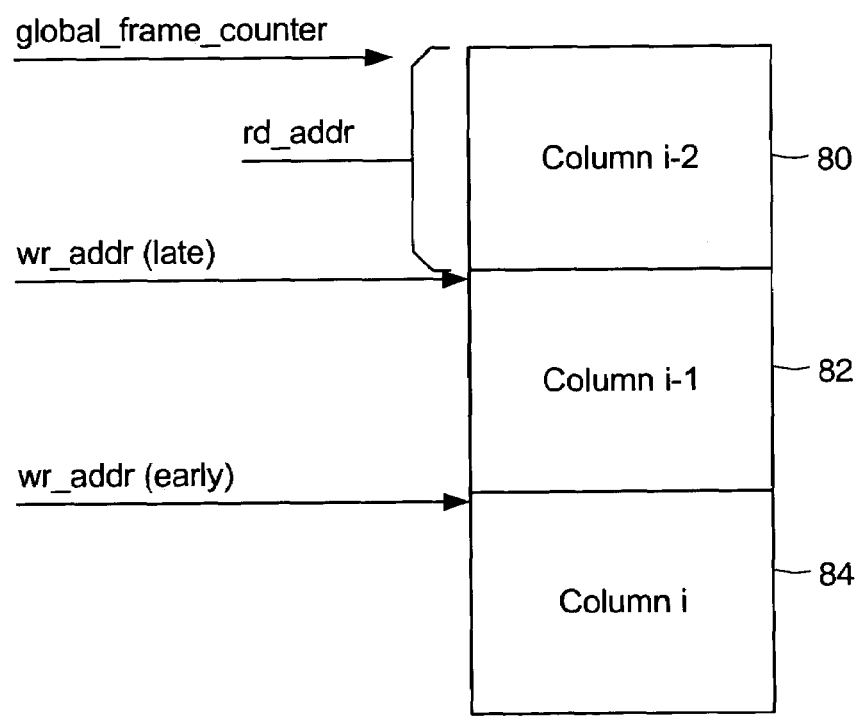
Figure 18:
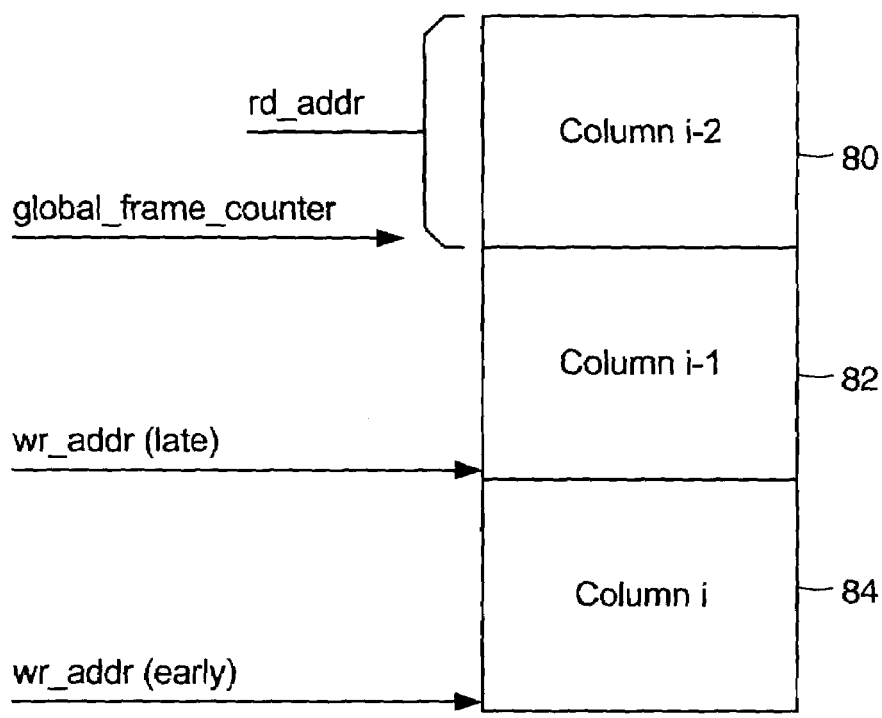

To ensure that the read pointer does not attempt to read a value before it is written, the local frame counter (which is also used as the write pointer) must be between 48 and 96 byte times ahead of the global frame counter. This relationship between local and global frame counters is illustrated in FIGS. 17 and 18. FIG. 17 shows the pointer positions at the start of a column where the two illustrated write pointers correspond to frames beginning at the earliest and latest possible times within the 48-byte window of FIG. 13. The global frame counter is pointing at the beginning of column i-2 while the local frame counter (write pointer) for the earliest input frame (96 bytes ahead) points to the beginning of column i and the local frame counter for the latest input frame (48 bytes ahead) points to the beginning of column i-1. The permutation RAM can translate the subframe field of the global frame counter into an arbitrary value between 0 and 47 on the interchange_sts signal. Thus, the read address can fall anywhere within column i-2 as shown in the figure. Anywhere the read pointer falls in this range, however, the read is safe in that it will not read data from a column that is being written. This is because the write pointer (early or late) points into columns i and i-1 while the read pointer reads from column i-2.

FIG. 18 shows the pointer positions at the end of the column, when the global frame counter points to the last entry of column i-2. As before, because of translation, the read pointer may fall anywhere in column i-2. The reads are still safe, however because both the early and late write pointers are still restricted to point into columns i and i-1.

Although the single dual port RAM module is preferred, the Input Data RAM could be formed of multiple smaller single port RAM modules.

Non-contiguously Addressed RAM

The three 48-byte buffers of FIGS. 16-18 lie in non-contiguous regions of RAM address space. The buffers are at hexadecimal addresses 0-2F, 40-6F, and 80-AF. Because of this non-contiguous addressing, if the Input Data RAM of FIG. 15 is realized with a conventional contiguously-addressed memory, a substantial number of storage locations will go unused. These unused storage locations consume valuable chip space and add capacitance that causes the RAM to dissipate more power than necessary. To avoid this inefficiency, the Input Data RAM 78 in the disclosed embodiment is designed with decoders that support non-contiguous addressing so that only the storage locations used by the three 48-byte buffers need be instantiated.

Figure 19:
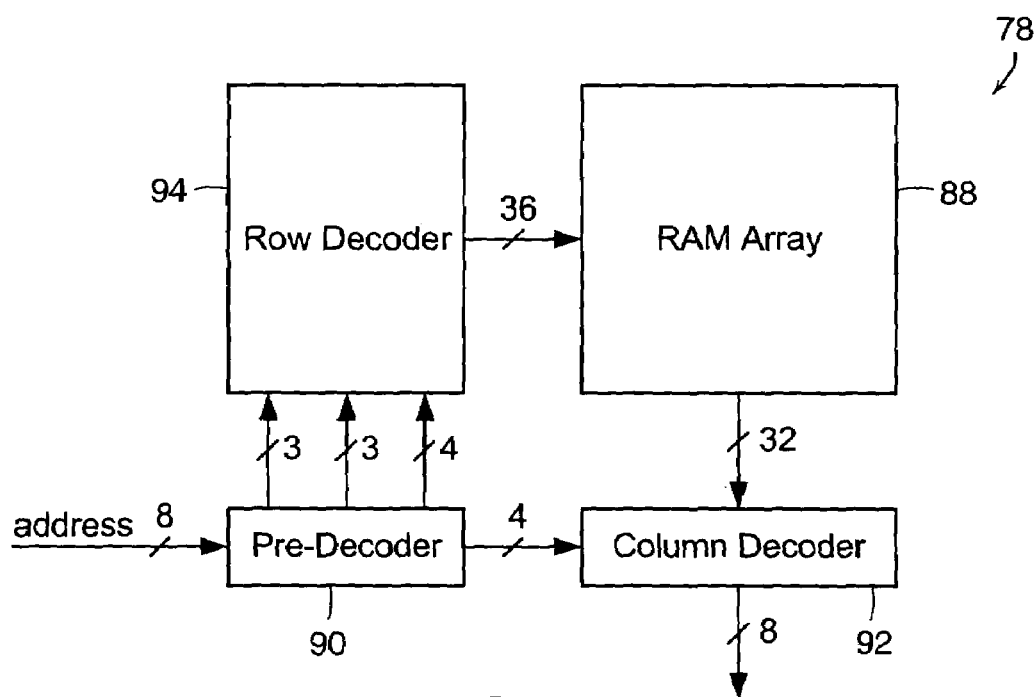
FIG. 19 illustrates the read decoders included in the input data RAM of FIG. 15.

A block diagram of the non-contiguously addressed RAM 78 of the present invention is shown in FIG. 19. The figure shows the RAM array 88 and the decoders associated with the read port. A similar but separate set of decoders (not shown) is used to support the write port. The heart of the RAM is a 36 row by 32 column array 88 of bit cells. Because the input and output ports are byte wide, this is in effect a 36 row by four (byte-wide) column array. Note that with contiguous addressing, a 64 row by 32 column RAM array would be required. A particular byte in the RAM array is selected by a decoder structure consisting of a predecoder, a row decoder, and a column decoder. An eight-bit address is input to a predecoder 90 that decodes the four 2-bit fields of the eight bit address into two one-of-three and two one-of-four one-hot address fields. The low-order one-of-four field is used by the column decoder 92 to directly select one of four bytes from the 32 bit line pairs output from the RAM array. The remaining three one-hot fields are decoded by the row decoder 94 to select one of the 36 rows in the RAM array. In this manner, the 8-bit input address selects a single byte from among the 144 bytes in the RAM array.

Figure 20:
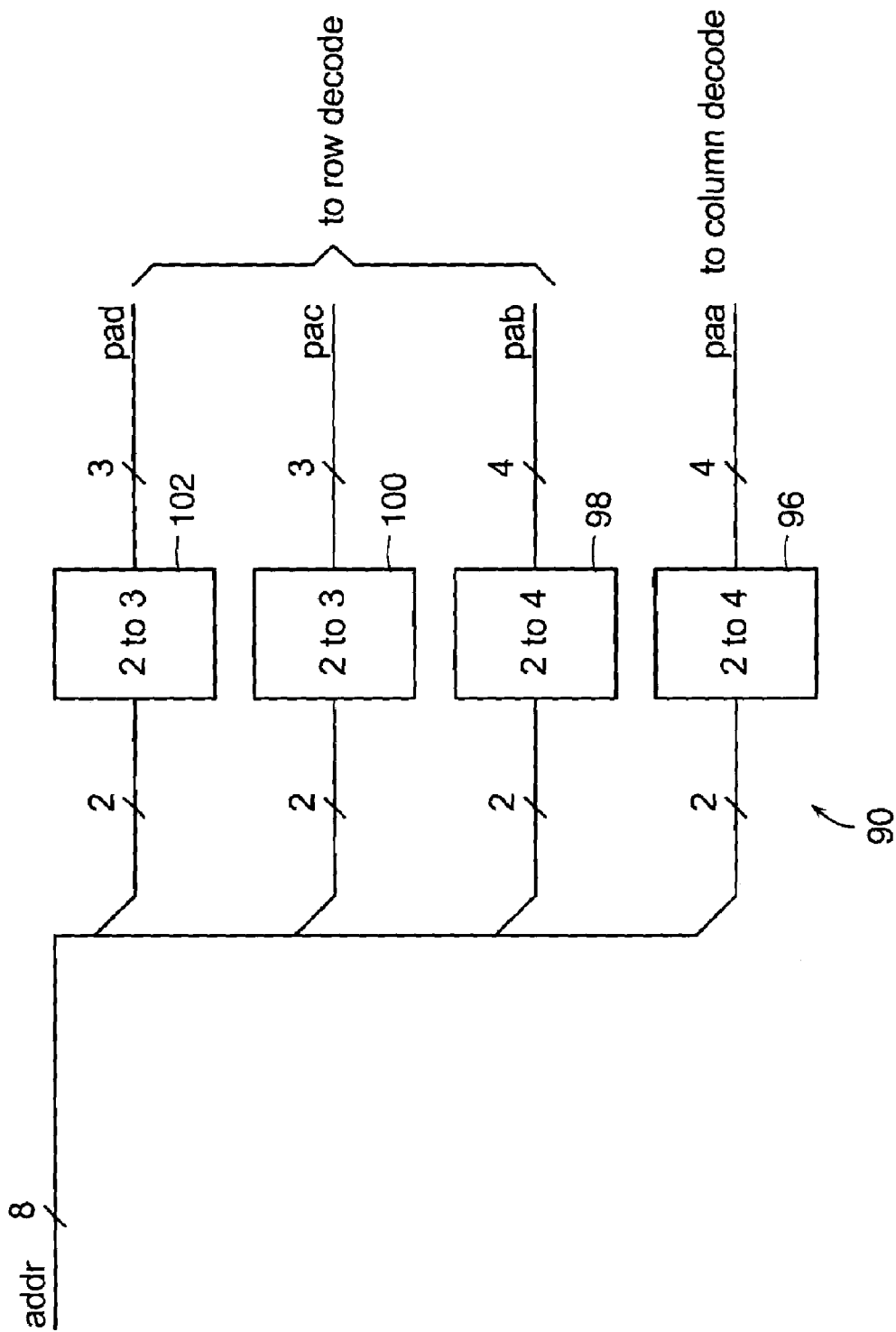
FIG. 20 illustrates the predecoder of FIG. 19.

As shown in FIG. 20, the predecoder comprises two 2-to-4 decoders 96,98 and two 2-to-3 decoders 100,102. Each 2-to-4 decoder accepts two bits of the eight-bit input and generates four output lines corresponding to input states 00,01,10, and 11. Each output line is true when the input lines are in the corresponding state. The 2-to-3 decoders are identical to the 2-to-4 decoders except that the output line corresponding to the 11 input state is not present. The output of the low-order 2-to-4 decoder 96, paa, is used to directly select one of four byte-wide columns from the four-byte wide array. The outputs of the three high-order decoders, pab, pac, and pad, together select one of the 36 rows of the RAM array.

While in the disclosed embodiment the non-contiguously addressed RAM uses 2-to-3 decoders, in general such a RAM can be implemented with an n-to-($2^n$–p) decoder. For the preferred embodiment n=2 and p=1. However, such a RAM could also be implemented using 3-to-6 decoders where n=3 and p=2.

Figure 22:
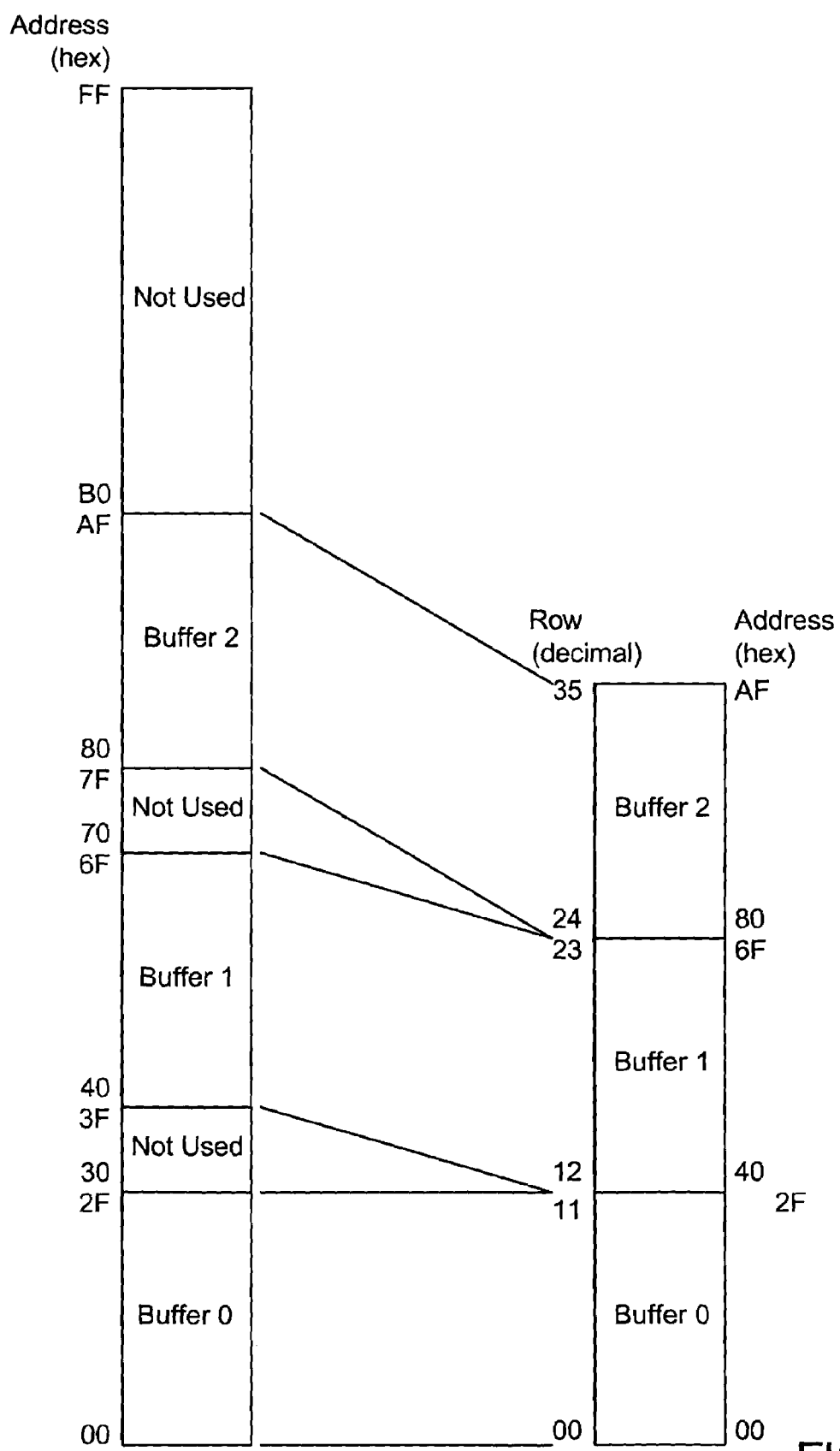
FIG. 22 illustrates mapping of noncontiguous address space to a contiguous set of RAM rows using the predecoder of FIG. 19.

The non-contiguous addressing of the RAM is achieved by using 2-to-3 decoders in the predecoder to map a non-contiguous address space to a contiguous set of RAM rows. When a valid address, a, (one that lies within one of the three buffers) is presented to the predecoder, it asserts one line of each of its four one-hot outputs: paa[i], pab[j], pac[k], and pad[m] so that a=i+4*j+16*k+64*m. Because the most significant two two-bit fields of the 8-bit address are decoded with 2-to-3 decoders, this address, a, selects a row, b, given by b=j+4*k+12*m. The effect of mapping a to b is to compress out the unused portions of the address space. This compression is illustrated in FIG. 22. The left side of the figure shows the 256-byte address space covered by 8-bit address a. This space includes three unused regions. The right side of the figure shows the 36 rows of the RAM array covered by row number, b. The mapping from a to b is depicted by the lines between the two sides of the figure. As can be seen, only addresses that fall within the three buffers are mapped to rows of the RAM arrays. Addresses in the unused spaces of the address space result in an all-zero output of one or both of the 2-to-3 decoders and hence do not map to any row of the RAM array.

Figure 21:
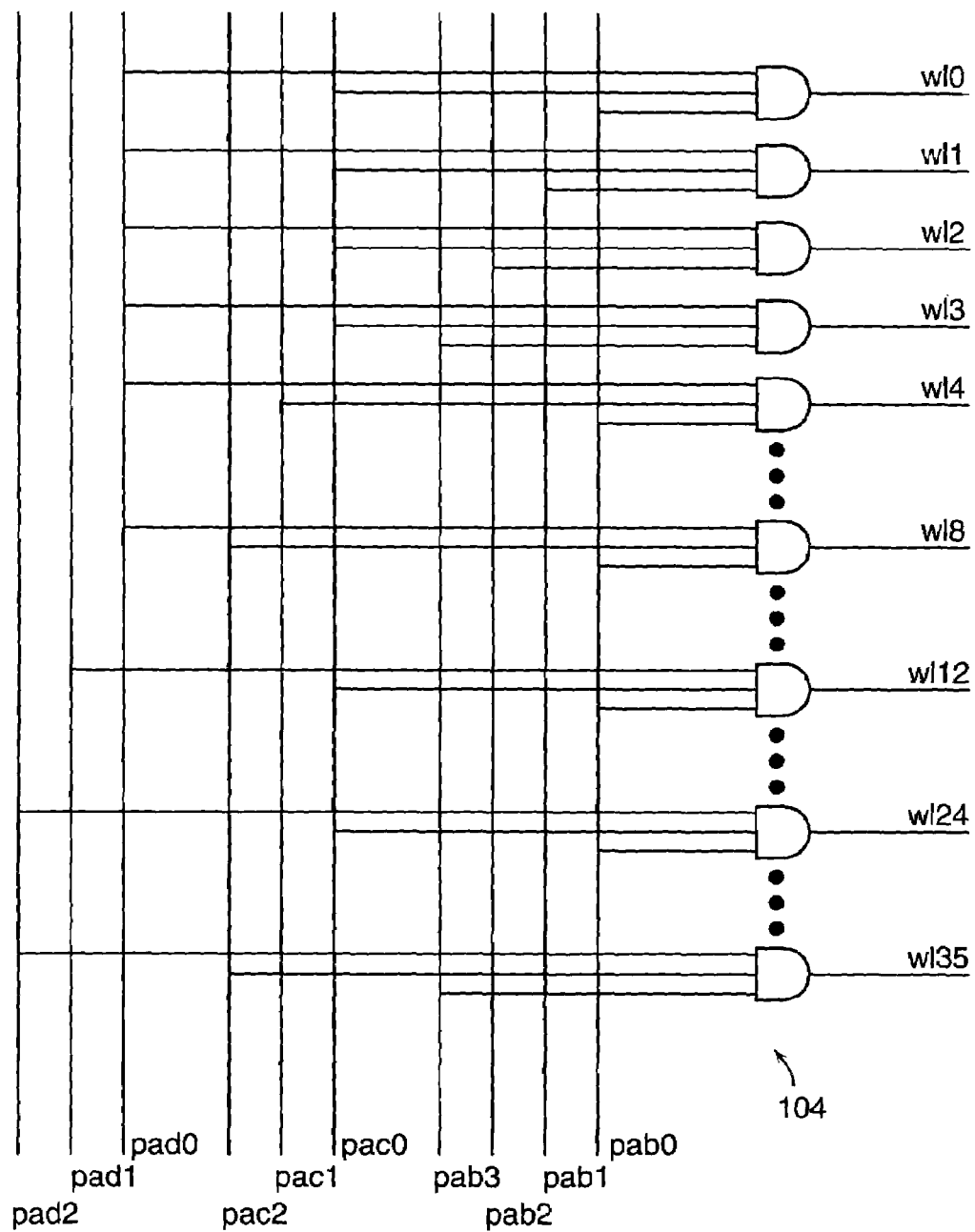
FIG. 21 illustrates the row decoder of FIG. 19.

The row decoder 94 decodes the coincidence of a particular line from each of pab, pac, and pad into the selection of one of 36 word lines using 36 three-input AND gates 104 as illustrated in FIG. 21. The AND gate for word line b, wlb, connects to pab[j], pac[k], and pad[m] such that b=j+4*k+12*m. For example, word line b=12 connects to pab[0], pac[0], and pad[1] so that b=j+4*k+12*m=0+4*0+12*1=12. For clarity, only 9 of the 36 word lines are shown in the figure. The remaining word lines follow a similar pattern.

Figure 23:
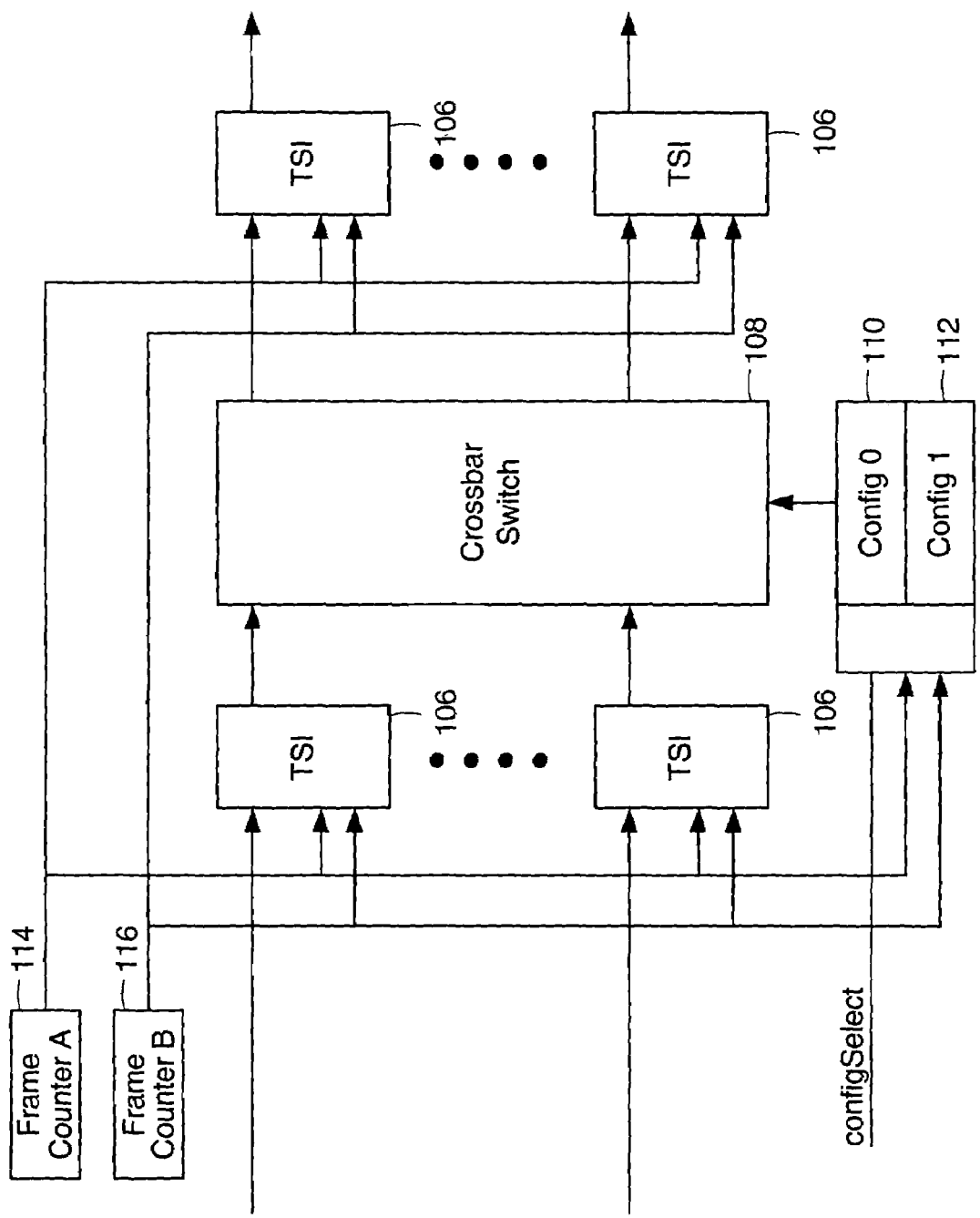
FIG. 23 illustrates a single chip in the embodiment of FIG. 7.

FIG. 23 illustrates a single switch chip used in each of the stages of FIG. 7. A TSI 106 as illustrated in FIG. 15 is associated with each of the 72 input and 72 output ports of the chip. A crossbar switch 108 serves as the space switch as determined by one of the configuration storage 110,112. In addition to the space configuration storage 110,112, each TSI includes its own configuration memory, the permutation RAM 86 of FIG. 15, which is divided into sections for configuration 0 and configuration 1. ConfigSelect toggles on the first byte of a frame to switch configurations.

Two frame counters 114,116 support a combined first-stage/last-stage switch on a single chip. One counter provides timing to all inputs and outputs that are used for the first stage, and the second counter provides timing to all inputs and outputs used for the last stage. As shown in FIG. 6, the timing of the output stages lags the timing of the input stages by the amount of time needed to propagate through two switches. The assignment of inputs and outputs to the two framing time bases is completely programmable. Any input or output can be assigned to either of the global frame counters.

While this invention has been particularly shown and described with references to preferred embodiments thereof, it will be understood by those skilled in the art that various changes in form and details may be made therein without departing from the scope of the invention encompassed by the appended claims.

What is claimed is:

1. A time-slot interchanger for interchanging the order of subframes of data within an input data frame comprising:
   a global frame clock;
   an interchange random access memory receiving the input data frame, out of alignment with the global frame clock, at an input;
   a write address generator which addresses the interchange random access memory to write subframes, out of alignment with the global frame clock, in a received order, wherein the write address generator generates the write address from a count of a local frame counter synchronized to the input data frame;
   a global frame counter comprising (a) a delay block configured to receive the global frame clock and present a start of frame signal and (b) a counter circuit configured to generate a count in response to the start of frame signal and a byte clock, wherein the delay block delays the global frame clock by a predetermined number of byte clocks and the count comprises (i) a subframe field, (ii) a column field, (iii) a column-group field and (iv) a row field; and
   a read address generator which addresses the interchange random access memory to read subframes in inter-changed order and aligned to the global frame clock, wherein the read address generator transforms the count of the global frame counter to generate the read address.

2. A time-slot interchanger as claimed in claim 1 wherein the global frame counter count is transformed in a random access memory.

3. A time-slot interchanger as claimed in claim 1 wherein the interchange random access memory forms N>2 buffers, the local frame counter being between one and N−1 buffer lengths ahead of the global frame counter.

4. A time-slot interchanger as claimed in claim 3 wherein the input data frames are SONET frames and the buffer length is a column length.

5. A time-slot interchanger as claimed in claim 1 wherein the interchange random access memory is noncontiguously addressed.

6. A time-slot interchanger as claimed in claim 5 further comprising a predecoder which maps the noncontiguous address space to instantiated locations in the interchange random access memory.

7. A time-slot interchanger as claimed in claim 6 wherein the predecoder includes at least one n-to-($2^n$–p) decoder for some integers n and p.

8. A time-slot interchanger as claimed in claim 1 wherein the interchange random access memory comprises three buffers and the local frame counter includes a modulo 3 counter field which selects one of the three buffers.

9. A time-slot interchanger as claimed in claim 8 wherein the input data frames are SONET STS-M frames and each of the buffers in the interchange random access memory comprise M bytes.

10. A time-slot interchanger as claimed in claim 9 where equals 48.

11. A digital cross connect comprising plural switching stages, each stage having plural switches receiving plural frames of time multiplexed input data and switching the data in time and space, at least one switch of at least one stage comprising a time-slot interchanger as claimed in claim 1.

12. A time-slot interchanger as claimed in claim 1 further comprising a multiplexer circuit configured to generate said global frame clock by multiplexing an external frame clock input and a plurality of start of frame signals, wherein each of the start of frame signals is synchronized to a respective one of a plurality of data inputs.

13. A method of interchanging the order of subframes of data within an inputdata frame comprising:
   providing a global frame clock;
   at an input to an interchange random access memory, receiving the input data frames, out of alignment with the global frame clock;
   generating write addresses which address the interchange random access memory to write subframes, out of alignment with the global frame clock, in a received order, wherein the write address is generated from a local frame counter synchronized to the input data frame;
   generating a start of frame signal in response to a delayed global frame clock, wherein the global frame clock is delayed by a predetermined number of byte clocks;
   generating a global frame count in response to the start of frame signal and the byte clock, wherein said global frame count comprises (i) a subframe field, (ii) a column field, (iii) a column-group field and (iv) a row field; and
   generating read addresses which address the interchange random access memory to read subframes in interchanged order and aligned to the global frame clock, wherein a read address is generated in response to said global frame count.

14. A method as claimed in claim 13 wherein the read address is generated by transforming the global frame count.

15. A method as claimed in claim 14 wherein the global frame count is transformed in a random access memory.

16. A method as claimed in claim 13 wherein the interchange random access memory forms N>2 buffers, the local frame counter being between one and N−1 buffer lengths ahead of a global frame counter.

17. A method as claimed in claim 16 wherein the input data frames are SONET frames and the buffer length is a column length.

18. A method as claimed in claim 13 wherein the interchange random access memory is noncontiguously addressed.

19. A method as claimed in claim 18 further comprising predecoding addresses to the interchange random access memory to map the address space to instantiated locations in the interchange random access memory.

20. A method as claimed in claim 19 wherein predecoding addresses to the interchange random access memory is performed using at least one n-to-($2^n$−p) decoder for some integers n and p.

21. A method as claimed in claim 13 wherein the input data frames are SONET STS-M frames and the interchange random access memory includes three buffers, each of M bytes.

22. A method as claimed in claim 21 where M equals 48.

23. A method as claimed in claim 13 further comprising, in plural switching stages, receiving plural frames of time multiplexed input data and switching the data in time and space, the order of subframes being interchanged as recited in claim 13.

24. A method as claimed in claim 21 wherein the interchange random access memory comprises three buffers and the local frame counter includes a modulo 3 counter field which selects one of the three buffers.

25. A time slot interchanger for interchanging the order of subframes of data within an input data frame comprising:
   a global frame clock;
   interchange random access memory means for receiving the input data frame, out of alignment with the global frame clock;
   write address generator means for addressing the interchange random access memory means to write subframes, out of alignment with the global frame clock, in a received order;
   global frame counter means comprising (a) a delay means configured to receive the global frame clock and present a start of frame signal and (b) a counter means configured to generate a count in response to the start of frame signal and a byte clock, wherein the delay means delays the global frame clock by a predetermined number of byte clocks and the count comprises (i) a subframe field, (ii) a column field, (iii) a column-group field and (iv) a row field; and
   read address generator means for addressing the interchange random access memory means to read subframes in interchanged order and aligned to the global frame clock, wherein the read address generator means transforms the count to generate a read address.

26. A time-slot interchanger for interchanging the order of subframes of data within an input data frame comprising:
   a global frame clock;
   an interchange random access memory receiving the input data frame, out of alignment with the global frame clock, at an input;
   a write address generator which addresses the interchange random access memory to write subframes, out of alignment with the global frame clock, in a received order, wherein the write address generator generates the write address from a count of a local frame counter synchronized to the input data frame; and
   a read address generator which addresses the interchang6 random access memory to read subframes in interchanged order and aligned to the global frame clock, wherein (a) the read address generator transforms a count of a global frame counter to generate the read address and (b) the global frame counter comprises (i) a delay block configured to receive the global frame clock and present a start of frame signal, wherein the delay block delays the frame clock by a predetermined number of byte clocks, (ii) a first divider configured to generate a subframe field of the global frame counter count in response to the start of frame signal and the byte clock, (iii) a second divider configured to generate a column field of the global frame counter count in response to the start of frame signal, the byte clock and an output of the first divider, (iv) a third divider configured to generate a column-group field of the global frame counter count in response to the start of frame signal, the byte clock and an output of the second divider and (v) a fourth divider configured to generate a row field of the global frame counter count in response to the start of frame signal, the byte clock and an output of the third divider.

* * * * *